United States Patent
Gutman et al.

(10) Patent No.: US 7,367,847 B2
(45) Date of Patent: May 6, 2008

(54) INTEGRATED MODULE CONNECTION FOR HEV BATTERY

(75) Inventors: Robert Felix Gutman, Fraser, MI (US); Weiping Zhao, Superior Township, MI (US); Robert J. Young, Flat Rock, MI (US)

(73) Assignee: Alcoa Fujikura Ltd, Franklin, TN (US)

( * ) Notice: Subject to any disclaimer, the term of this patent is extended or adjusted under 35 U.S.C. 154(b) by 0 days.

(21) Appl. No.: 11/461,541

(22) Filed: Aug. 1, 2006

(65) Prior Publication Data

US 2007/0054561 A1 Mar. 8, 2007

Related U.S. Application Data

(60) Provisional application No. 60/714,034, filed on Sep. 2, 2005.

(51) Int. Cl.
*H01R 9/03* (2006.01)

(52) U.S. Cl. ............... 439/656; 439/725; 429/158

(58) Field of Classification Search ........... 439/656, 439/756, 754, 627, 625, 626, 708, 725; 411/277; 429/158

See application file for complete search history.

(56) References Cited

U.S. PATENT DOCUMENTS

| | | | |
|---|---|---|---|
| 4,239,836 A | 12/1980 | Picciolo | |
| 5,427,553 A | 6/1995 | Tsuji | |
| 5,602,148 A | 2/1997 | Bobee et al. | |
| 5,632,654 A * | 5/1997 | Sugiura | 439/620.26 |
| 6,136,465 A | 10/2000 | Kuboshima et al. | |
| 6,902,444 B1 | 6/2005 | Shannon, Jr. | |
| 7,208,247 B2 * | 4/2007 | Chan et al. | 429/158 |
| 2002/0182480 A1 | 12/2002 | Hanauer et al. | |
| 2003/0108789 A1 * | 6/2003 | Yamakawa et al. | 429/121 |
| 2004/0258985 A1 | 12/2004 | Tsai | |
| 2005/0001585 A1 | 1/2005 | Tashiro | |
| 2005/0064285 A1 | 3/2005 | Fujii et al. | |

(Continued)

FOREIGN PATENT DOCUMENTS

EP 0892 450 A2 1/1997

(Continued)

OTHER PUBLICATIONS

Communication Relating to the Results of the Partial International Search which was issued in the related PCT Application No. 2006/033523.

(Continued)

*Primary Examiner*—Michael C. Zarroli
(74) *Attorney, Agent, or Firm*—Greenberg Traurig, LLP

(57) ABSTRACT

The present invention provides a battery module system including a plurality of battery modules in a series electrical connection through a specified sequence, each battery module having a male connector and a female connector, the female connector of each battery module in electrical engagement into the male connector of an adjacent battery module, wherein the male connector and female connector are positioned along the sidewall of each battery module and have insulating structures that protect handlers of the battery modules from high voltage electrocution. The present invention also provides a battery module system in which the male and female connectors are attached to a top surface of each battery module.

30 Claims, 19 Drawing Sheets

U.S. PATENT DOCUMENTS

2005/0079408 A1 4/2005 Hirano
2006/0270286 A1* 11/2006 Zhao et al. ................ 439/840

FOREIGN PATENT DOCUMENTS

| EP | 0 765 005 | A2 | 3/1997 |
| EP | 0825 658 | A2 | 2/1998 |
| EP | 0834 944 | A1 | 4/1998 |
| EP | 1 164 645 | A1 | 12/2001 |
| GB | 1547752 | | 2/1978 |
| GB | 28 05 715 | A1 | 8/1978 |

OTHER PUBLICATIONS

Notification of Transmittal of the International Search Report and the Written Opinion of the International Searching Authority which was issued in the related PCT Application No. 2006/033523.

* cited by examiner

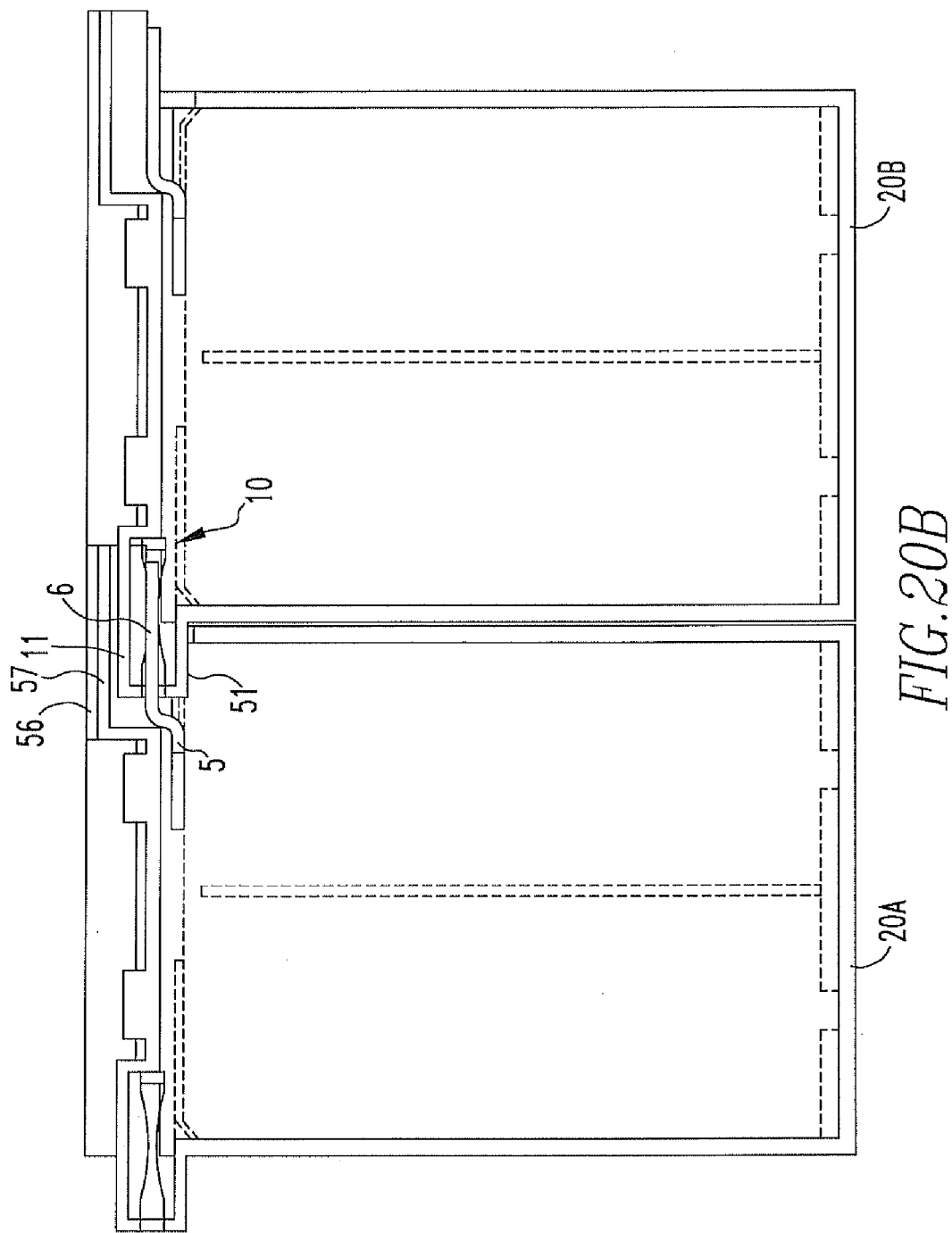

INTEGRATED MODULE CONNECTION FOR HEV BATTERY

CROSS REFERENCE TO RELATED APPLICATIONS

The present invention claims the benefit of U.S. provisional patent application No. 60/714,034, filed on Sep. 2, 2005, the whole contents and disclosure of which are incorporated by reference as is fully set forth herein.

FIELD OF THE INVENTION

The present invention relates to high current electrical connections. The present invention further relates to high voltage battery modules comprising a series of connectors having a stricture and an assembly sequence that substantially eliminates the incidence of high voltage electrocution.

BACKGROUND OF THE INVENTION

Hybrid Electrical Vehicle (HEV) battery packs consist of number of battery modules, wherein each battery module has a plurality of battery cells. Typically, the battery modules are in electrical communication through module to module series connections. Module to module connections typically require nut and bolt arrangements that provide a number of difficulties, since this manufacturing method is prone to over-torquing or under-torquing of the nut and bolt fasteners. Additionally, cross threading of the bolts is also common, which may destroy the positive or negative battery post when over-torqued. The concise assembly required for high voltage battery module manufacturing and the need for closely monitored torque control render bolt and nut arrangements uneconomical for high voltage battery module manufacturing.

Further, methods for manufacturing high voltage battery modules present a number of dangers to those handling the high voltage battery modules during and after the manufacturing process. Although, each module usually has less than a 50 volt capacity, battery modules are currently being connected in series in order to meet the increasing demands of high-voltage applications, in which voltage levels on the order of about 100 volts to greater than 600 volts are presenting a number of challenges for ensuring safety during the manufacture of these high voltage connections using typical manufacturing methods.

In light of the above, what is needed is an electrical connector system for high current and high voltage applications that can be manufactured in an economical and safe fashion. Further, a need exists for a maintenance serviceable battery pack in which electrical connectors may be reliably and safely manufactured.

SUMMARY OF THE INVENTION

These needs, and others, are met by the present invention which provides a battery module system suitable for series connection high current applications, wherein each battery module comprises a male and female connector configured to allow for a plurality of battery modules to be interconnected in series into battery packs, while providing insulating structures that protect handlers from electrocution during assembly.

In one embodiment of the inventive battery module system, the male and female connectors are positioned on opposing sidewalls of each battery module. Broadly, the inventive battery module system comprises:

a plurality of battery modules in electrical connection, each battery module of said plurality of battery modules comprising a male connector and a female connector, said female connector of said each battery module in electrical engagement into said male connector of an adjacent battery module;

said female connector comprising a conductive female terminal having a female insulating housing configured to protect an outer surface of the conductive female terminal while providing an opening to an inner surface of said conductive female terminal; and said male connector comprising a conductive male terminal and an insulating male shield positioned overlying said male conductive terminal, said conductive male terminal comprising a blade portion for insertion through said opening in said female insulating housing into electrical engagement with said inner surface of said conductive female terminal of said adjacent battery module, wherein a portion of said insulating male shield overlying said blade portion of said male conductive terminal is positioned over said female insulating housing when said blade portion is in electrical engagement with said inner surface of said conductive female terminal.

In one embodiment, the female connector and the male connector are positioned on opposing sidewalls of each battery module. In one embodiment, the female connector is positioned on the electrically positive sidewall of the battery module and the male connector is positioned on the electrically negative sidewall of the battery module. The female connector may comprise a female terminal having a slot positioned in a lower portion of the sidewall on which the female connector is positioned and the male connector may comprise a male terminal having a blade portion positioned in a lower portion of the sidewall on which the male connector is positioned. In another embodiment of the present invention, the slot of the female terminal may be positioned in a upper portion of said sidewall on which the female connector is positioned and the blade of the male connector may be positioned in a upper portion of the sidewall on which the male connector is positioned. The female insulating housing has dimensions to obstruct handlers of the battery module system from contacting the female terminal. The insulating male shield has dimensions to obstruct handlers of the battery module system from contacting the male terminal.

In one embodiment, a plurality of battery modules are connected in series to provide a first battery pack beginning with a initial battery module and terminating with a final battery module, wherein the initial battery module further comprises an initial negative terminal having an initial female connector and an initial protective cover and the final battery module comprises a final positive terminal having a final female connector and final protective cover. The initial protective cover and the final protective cover have dimensions to obstruct handlers of the battery module from contacting the corresponding underlying initial negative terminal and final positive terminal. The initial female connector (negative) and final female connector (positive) allow for a plurality of battery packs to be connected in series or provide the positive and negative post of a battery pack system to an electrically driven device.

In another aspect of the present invention a battery pack system is provided comprising a plurality of series connected battery packs, in which each battery pack has a structure and an assembly sequence that substantially reduces the incidence of high voltage electrocution. Broadly, the inventive battery pack system comprises:

a first plurality of battery packs in electrical connection, wherein electrical connection is provided in said first plurality of battery packs is provided by engagement a female terminal of a first battery pack receiving a male terminal of an adjacent battery pack, in which each battery pack in said first plurality of battery packs comprises:

a plurality of battery modules in electrical connection, wherein an initial battery module in said plurality of battery modules comprises said male terminal, a concluding battery module in said plurality of modules comprises said female terminal, and a plurality of intermediate battery modules between said initial battery module and said concluding battery module, wherein electrical communication between said initial battery module, said concluding battery module, and each battery module in said plurality of intermediate battery modules is provided by at least one buss bar; and at least one protective cover covering said male terminal, said female terminal, and said at least one buss bar, wherein at least a portion of said at least one protective cover covering said male terminal and said female terminal allows for insertion of said male terminal of said concluding battery module in said adjacent battery pack into said female terminal of an initial battery module in said first battery pack of said first plurality of battery packs.

In one embodiment of the above described battery pack system the protective covers covering the male connector, female connector, and buss bars obstruct handlers of the battery pack system from contacting the electrically conducting portions of each battery pack. In another embodiment of the battery pack system, an initial battery pack, a plurality of intermediate battery packs, and a concluding battery pack is provided wherein the first battery module of the initial battery pack comprises a first negative female terminal and a final battery module of the concluding battery pack comprises a first positive female terminal. In one embodiment, the first plurality of battery packs is in electrical connection to a second plurality of battery packs that are in series connection through at least one break connector, wherein the first plurality of battery packs and the second plurality of battery packs may be positioned adjacent to or distal from one another.

In another embodiment of the inventive system of battery modules, the male and female connectors of each battery module are positioned atop the upper surface of an initial battery cell and final battery cell of a plurality of battery cells that are in series connection. Broadly, the inventive battery module system comprises:

a plurality of battery modules in electrical connection, wherein electrical connection is provided in said plurality of battery modules is provided by engagement of a male terminal of a first battery module into a female terminal of an adjacent battery module, in which each battery module in said plurality of battery modules comprises:

a plurality of cells in electrical connection, wherein an initial cell in said plurality of cells comprises said male terminal and a concluding cell in said plurality of cells comprises said female terminal;

an insulating structure housing said plurality of cells, said insulating structure comprising a insulating lower tab corresponding to said female terminal; and an insulating cap atop said insulating structure substantially enclosing said plurality of cells, said insulating cap comprising a male protective cap overlying said male terminal and a female insulating cap structured to correspond with said lower tab of said insulating structure to produce a protective enclosure for said female terminal and an opening for insertion of said male terminal of said adjacent battery module, wherein a portion of said male protective cap is position over said protective enclosure of said female terminal when said male terminal of said adjacent battery module is in electrical contact with said female terminal of said first battery module.

In one embodiment of the above described battery module system, the female terminal is a positive terminal and the male terminal is a negative terminal. Each of the cells may be in electrical communication in series connection through at least one buss. The female terminal may comprise a slot having an exterior surface enclosed by a protective enclosure, in which the protective enclosure has an opening for insertion of the blade portion of the male terminal. The protective enclosure may have dimensions to obstruct handlers of the battery module from contacting the female terminal. In another embodiment of the present invention, a handling cap is positioned on the male terminal of the first battery module in the plurality of battery modules to protect handlers from contacting the male terminal.

BRIEF DESCRIPTION OF THE DRAWINGS

A full understanding of the invention can be gained from the following description of the preferred embodiments when read in conjunction with the accompanying drawings in which:

FIGS. 20a-20b (cross-sectional view) illustrate two battery modules, as depicted in FIG. 19b, being electrically connected.

DETAILED DESCRIPTION OF PREFERRED EMBODIMENTS

Figure 1:
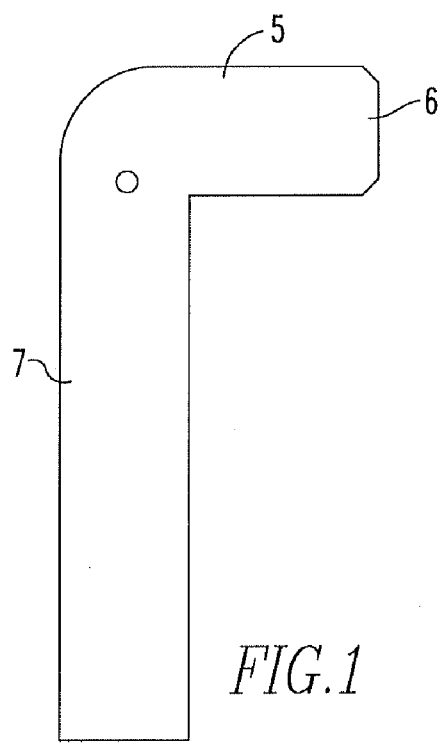
FIG. 1 (isometric view) illustrates one embodiment of a male terminal.

The present invention provides an electrical connection system for modular batteries suitable for high current and voltage applications having increased reliability, safety and serviceability. The present invention is now discussed in more detail referring to the drawings that accompany the present application. In the accompanying drawings, like and/or corresponding elements are referred to by like reference numbers.

FIG. 1 represents one embodiment of a male terminal 5 in accordance with the present invention. In one embodiment of the present invention, the male terminal 5 comprises a blade portion 6 and a male base portion 7. In some embodiments of the present invention, the blade portion 6 is perpendicular to the base portion 7. The male terminal 5 may be formed of a stamped material selected from the group consisting of, but not limited to: copper, aluminum, steel, and combinations and alloys thereof. In a preferred embodiment, the stamped sheet metal comprises copper alloy. Although, the male terminal 5 is preferably formed of stamped copper alloy, any material and any forming method is applicable to the inventive male terminal 5, so long as the material and forming method produces an electrically conductive male terminal 5.

Figure 2:
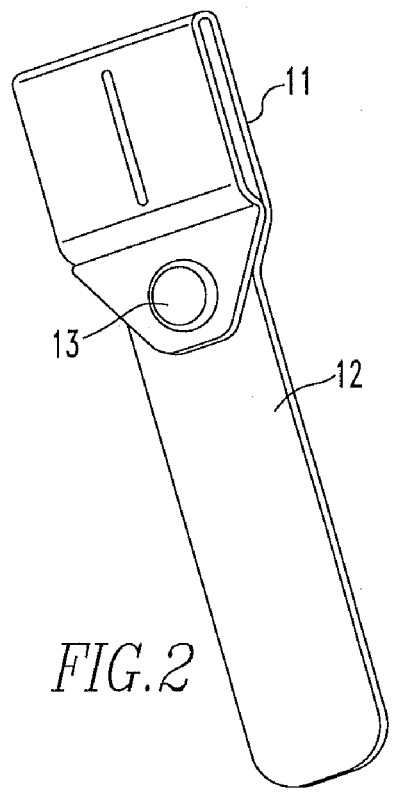
FIG. 2 (isometric view) illustrates one embodiment of a female terminal.

FIG. 2 depicts one embodiment of a female terminal 10 in accordance with the present invention. In one embodiment, the female terminal 10 comprises a slot 11 positioned at a first end of the female terminal 10 and a female base portion 12 at a second end of the female terminal 10. In one embodiment of the present invention, the slot 11 and the female base portion 12 are mechanically connected at a joint 13. In another embodiment of the present invention the female terminal 10 may comprise of a unitary structure.

The slot 11 of the female connector 10 may be configured having dimensions suitable for reversible engagement with the blade portion 6 of the male terminal 5. In one embodiment of the present invention, the engagement of the blade portion 6 of the male terminal 5 with the inner surface of the slot 11 of the female terminal 10 results in an electrical connection of the male terminal 5 to the female terminal 10. Although, the female terminal 10 preferably comprises a slot portion 11, the female terminal 10 may have any configuration, so long as, the female terminal 10 can be reversibly engaged in electrical contact with the male terminal 5. The female terminal 10 may be formed of a stamped sheet metal selected from the group consisting of, but not limited to: copper, aluminum, steel, and combinations and alloys thereof. In a preferred embodiment, the stamped sheet metal comprises copper alloy. Although, the female terminal 10 is preferably formed of stamped copper alloy, any material and any forming method is applicable to the inventive female terminal 10, so long as the material and forming method produces an electrically conductive female terminal 10.

Figure 3A:
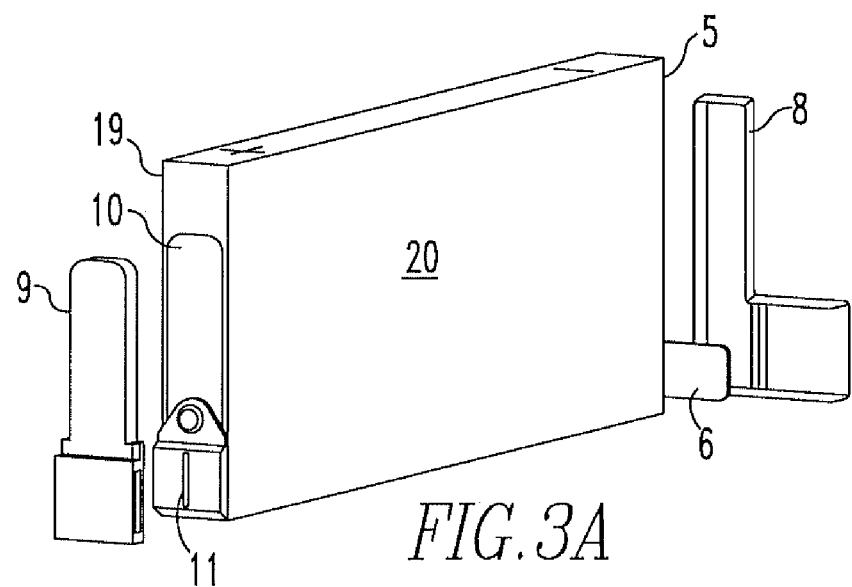
FIGS. 3a and 3b (exploded view) illustrate one embodiment of a battery module of the present invention having male and female terminals, as depicted in FIGS. 1 and 2, positioned along opposing sidewalls of the battery module, wherein the blade portion of the male terminal and the slot portion of the female terminal are positioned in an lower portion of the battery modules sidewall.
Figure 3B:
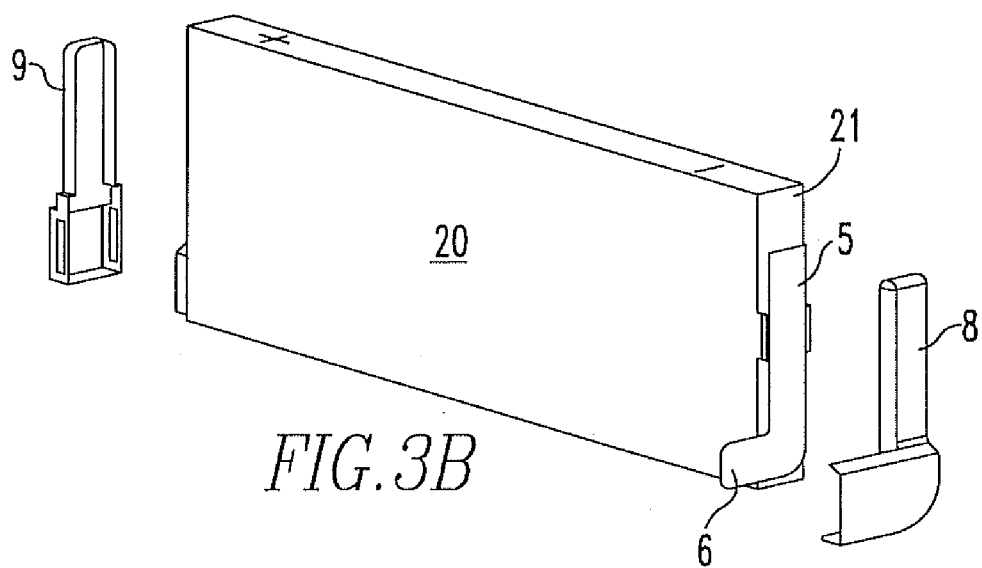

Referring to FIGS. 3a and 3b, the female terminal 10 may be positioned on a first sidewall 19 (electrical positive side of module) of a battery module 20 and the male terminal 5 may be positioned on the opposing sidewall (second sidewall 21, electrical negative side of module) of the battery module 20. Preferably, the sidewall on which the female terminal 10 is positioned is on the electrically positive side of the battery module 20 and the sidewall on which the male terminal 5 is positioned is the electrically negative side of the battery module 20. Alternatively, the female terminal 10 is positioned on the negative side of the battery module 20 and the male terminal 5 is positioned on the positive side of the battery module 20.

In one embodiment, the male terminal 5 may be positioned so that the blade portion 6 of the male terminal 5 is in the lower portion of the battery module sidewall 21 on which the male terminal 5 is positioned, and the female terminal 10 may be positioned so that the slot portion 11 of the female terminal 10 is in the lower portion of the battery module sidewall 19 on which the female terminal 10 is positioned. The blade portion 6 of the male terminal 5 may extend beyond the edge of the sidewall 21 on which the male terminal 5 is positioned in a direction to provide an assembly sequence that ensures that the battery modules are interconnected in a sequence that protects the handlers of the battery modules from contacting the electrically conductive portions (terminals) of the series connected battery modules.

The female terminal 10 and male terminal 5 may be mechanically attached to the first sidewall 19 and the second sidewall 21 of the battery module 20 by welds, glue, and/or bolt/nut arrangements, wherein the female terminal 10 and the male terminal 5 are in electrical contact with the battery module 20. Although it is preferred that the terminals 5, 10 are attached to the sidewalls 19, 21 by laser welding, any means of attachment may be used so long as the terminals 5, 10 are in electrical contact with the battery module 20.

Figure 4A:
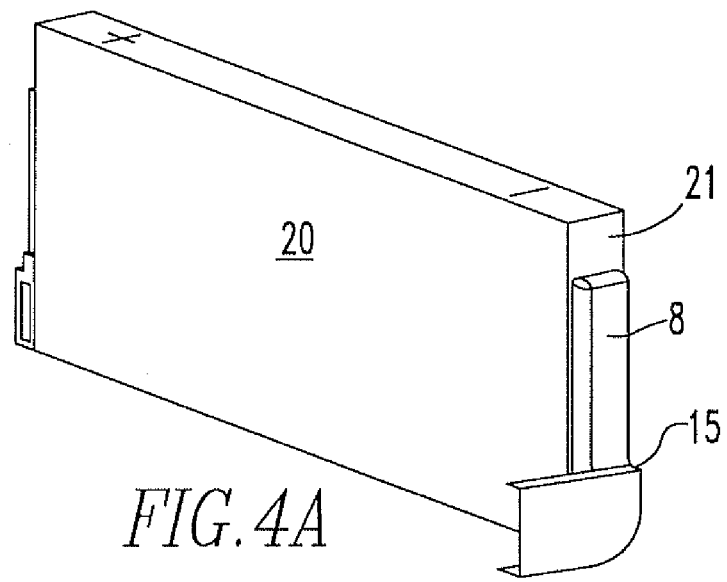
FIGS. 4a and 4b (isometric view) illustrate the battery module depicted in FIG. 3a in which the battery module connectors are assembled.
Figure 4B:
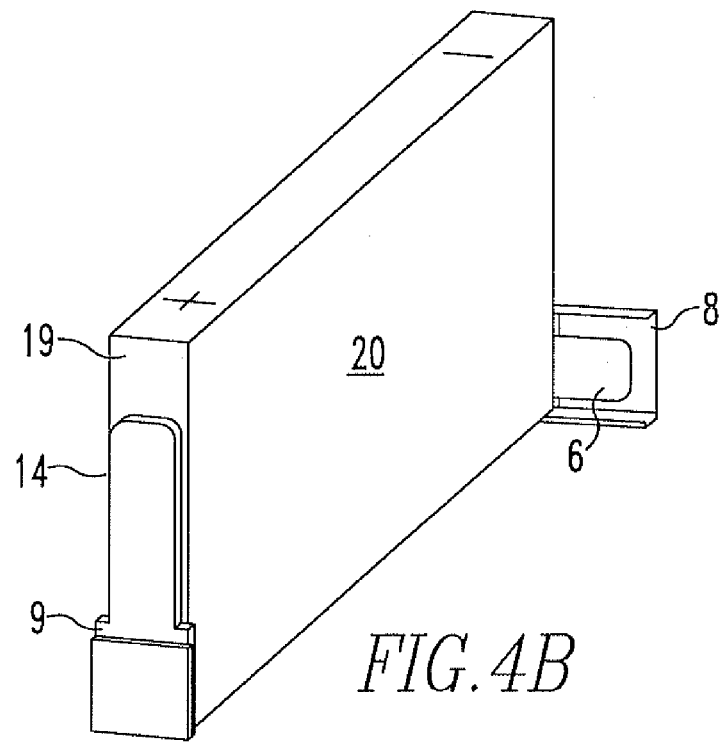
Figure 5A:
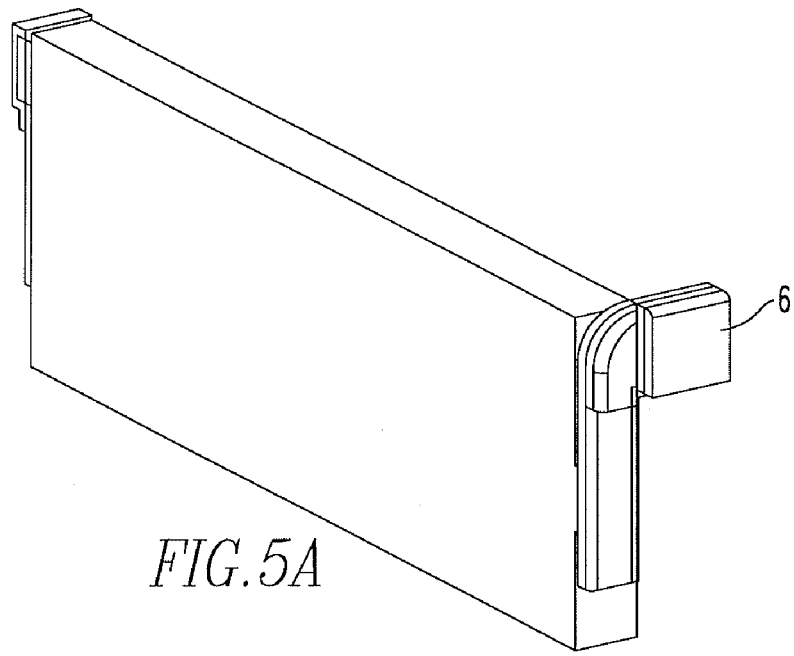
FIGS. 5a-5b (isometric view) illustrate another embodiment of a battery module of the present invention having female and male connectors, as depicted in FIGS. 1 and 2, positioned along opposing sidewalls of the battery module, wherein the blade portion of the male terminal and the slot portion of the female terminal are positioned in an upper portion of the battery modules sidewall.
Figure 5B:
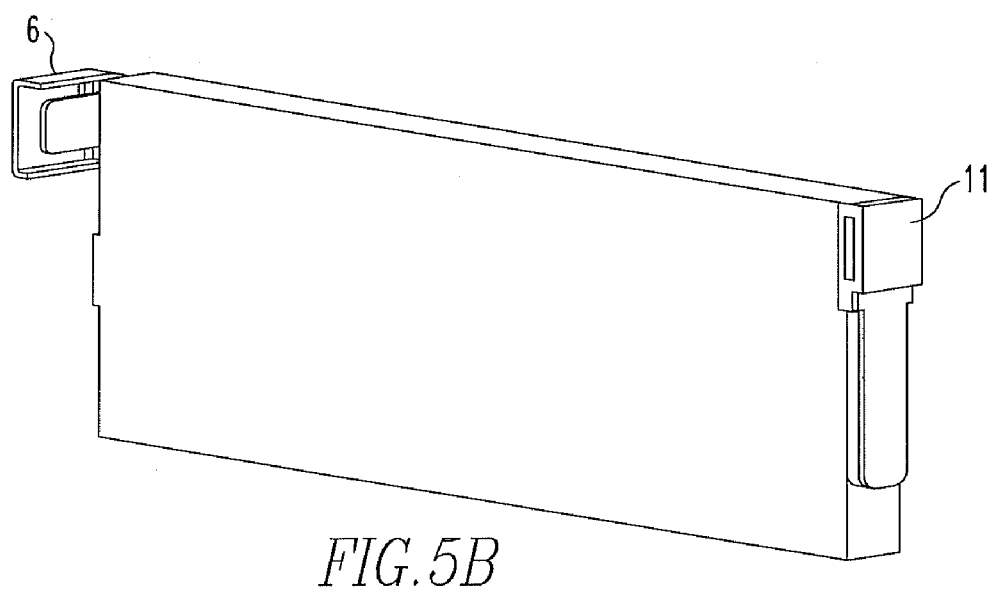

Still referring to FIGS. 3a and 3b, the male terminal 5 may be protected by a insulating male shield 8 (also referred to as a male insulating housing) and the female terminal 10 may be protected by a female insulating housing 9. Preferably, the dimensions of the female insulating housing 9 and the male insulating housing 10 obstruct handlers from contacting their corresponding terminals 5, 10, while having a geometry that allows for the blade portion 6 of the male terminal 5 of a first battery module to be reversibly inserted in electrical contact with the slot 11 of the female terminal 10 of an adjacent battery module. FIGS. 4a and 4b, depict the female insulating housing 9 and the male insulating housing 8 attached to opposing sidewalls of the battery module 20, wherein the female insulating housing 9 is overlying the female terminal 10 and the male insulating housing 8 is overlying the male terminal 5. The female insulating housing 9 and the female terminal 10 may be collectively referred to as a female connector 14, and the male insulating housing 8 and the male terminal 5 may be collectively referred to as a male connector 15. The male and female insulating housings 8, 9 may comprise any material that is not electrically conductive, which may include plastic. Referring to FIGS. 5a and 5b, in another embodiment, the blade portion 6 of the male terminal 5 and the slot portion 11 of the female terminal 10 are positioned in the upper portion of opposing sidewalls of the battery module 20.

Figure 6A:
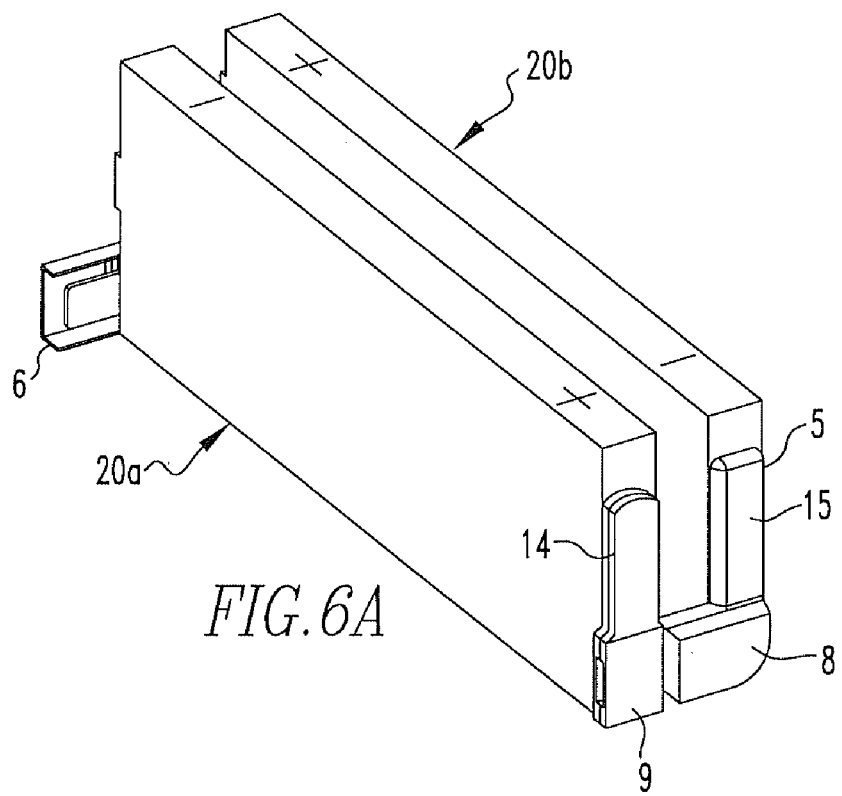
FIGS. 6a-6b (isometric view) illustrate two battery modules being electrically connected.
Figure 6B:
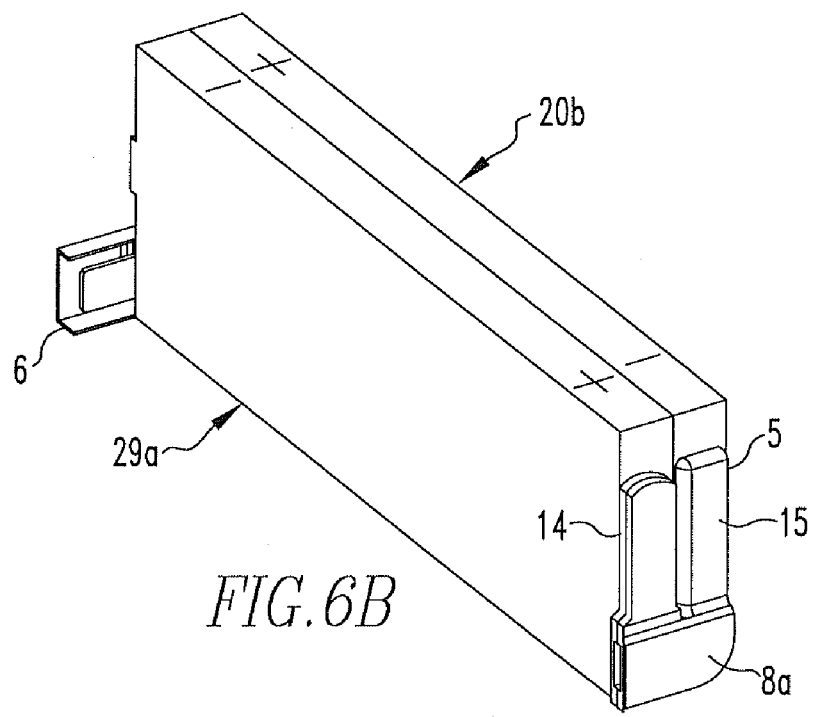

Referring to FIGS. 6a and 6b, a pair of adjacent battery modules 20a, 20b are depicted in which a first battery module 20a is electrically connected to a second battery module 20b through male and female connectors 14, 15. Referring to FIG. 6b, the blade portion 6 of the male terminal 5 of the first battery module 20a is partially protected by the male insulating housing 8, in which the male terminal 5 is electrically negative. The female terminal 10 of the first battery module 20a is electrically positive and is in electrical connection with the blade portion 6 of the negative male terminal 5 of the adjacent second battery module 20b, wherein the terminals 5, 10 are protected from contact by the female insulating housing 9 and the male insulating housing 8. Although not depicted, the positive terminal of the second battery module 20b is a female connector that may be reversibly engaged with the male connector of a third battery module (not shown). In this arrangement, an assembly sequence is maintained in which each battery module is engaged in a sequence, wherein each positive post that is in series connection is protected from handler contact prior to engagement by the female insulating housing 9 and is further protected by the portion of the male insulating housing 8 overlying the female connector 14 following engagement.

Figure 7A:
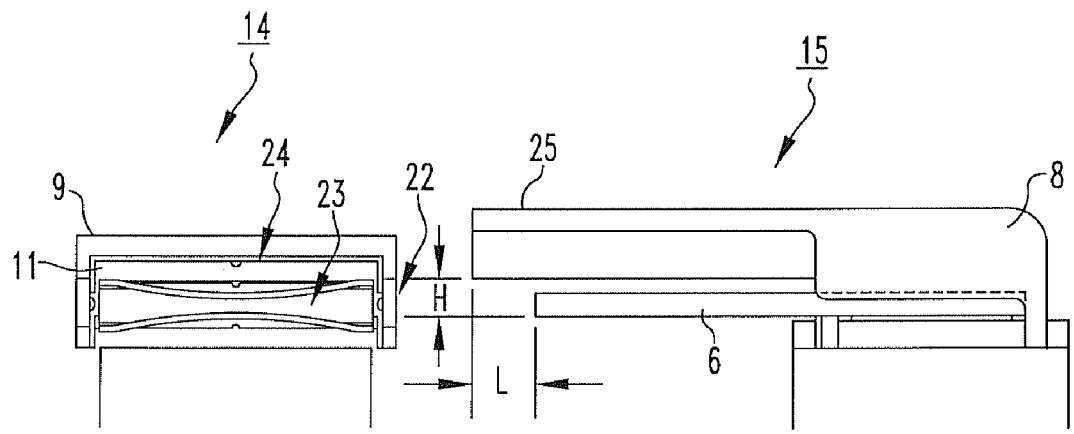
FIG. 7a (cross-sectional top view) illustrates one embodiment of a male connector having a male terminal connected to the sidewall of a first battery modules and a female connector having a female terminal connected to the sidewall of an adjacent battery module prior to being electrically connected.
Figure 7B:
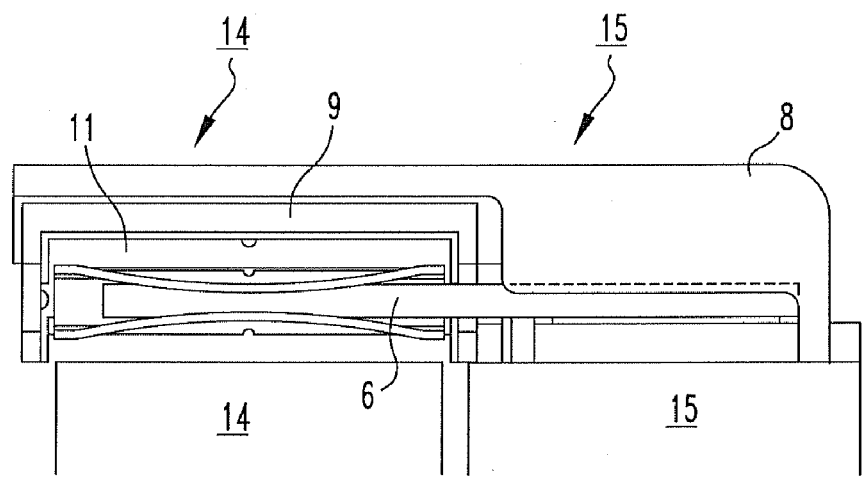
FIG. 7b (cross-section top view) illustrates the male terminal and female terminal depicted in FIG. 7a, wherein the male terminal is reversibly engaged in electrical contact with the female terminal.

Referring to FIGS. 7a and 7b, a magnified view of the male connector 15 and female connector 14 is provided. Referring to FIG. 7a, in which the male connector 15 and female connector 14 are not engaged, the female connector 14 comprises a female terminal having a slot portion 11 with an exterior surface 24 protectively enclosed by the female insulating structure 9, wherein the female insulating structure further provides an opening 22 to an interior surface 23 of the slot portion 11 of the female terminal 10. The opening 22 of the female insulating structure 9 has dimensions D which obstruct handlers from contacting the female terminal 10. Further, the dimensions D and geometry of the opening correspond to the dimensions of the blade portion 6 of the male terminal 5 to allow for the male terminal 5 to be inserted in electrical communication with the interior surface 23 of the female terminal 10. In one example, the female insulating housing 9 has an opening 22 with a length on the order of approximately 15 mm and a width on the order of approximately 2 mm, which obstructs handlers of the battery system from contacting the female terminal (preferably electrically positive) with their fingers. It is noted that the dimensions in the above example for the opening 22 in the female insulating housing 9 are provided for illustrative purposes only and are not intended to limit the invention to the example provided. The opening 22 in the female insulating housing 9 may be of any geometry and dimension, so long as the opening 22 allows for the male terminal 5 to electrically contact the female terminal 10 and has dimensions that obstruct the handlers of the battery system from contacting the electrically conductive portion of the female connector 14, preferably having dimensions that substantially eliminate the incidence of a handler's fingers from contacting the female terminal 10.

The male connector 15 comprises a male insulating structure 8 overlying the male terminal 5, in which the extending portion 25 of the male insulating structure 8 overlying the blade portion 6 of the male terminal 5 is extended beyond the edge of the blade 6 in order to obstruct handlers from contacting the male terminal 5. Referring now to FIG. 7b, as the male connector 15 is engaged into the female connector 14, the extending portion 25 of the male insulating structure 8 is slideably positioned overlying the exterior surface of the female insulating stricture 9 corresponding to the slot portion 11 of the female terminal 10.

Figure 8:
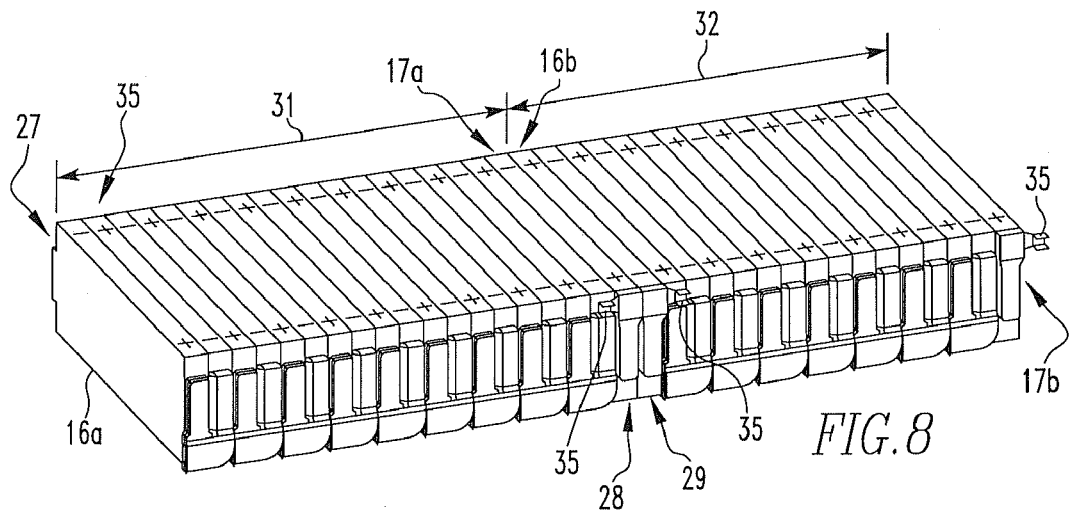
FIG. 8 (isometric view) depicts two battery packs in electrical connection, in which each battery pack comprises a plurality of battery modules in electrical communication.

Referring to FIG. 8, a preselected plurality of battery modules, as depicted in FIGS. 3a-4b, may be connected in series to provide at least one battery pack (first battery pack 31, second battery pack 32). It is noted, that any number of battery modules may be connected in series to provide a battery pack. In one embodiment a battery pack may comprise on the order of about more than thirty battery modules.

Still referring to FIG. 8, in one embodiment of the present invention, a plurality of battery packs 31, 32 may be connected in series, wherein each battery pack comprises at least two battery modules. Specifically, each battery pack 31, 32 may comprise at least an initial battery module 16a, 16b and a final battery module 17a, 17b. Each battery pack may further include an intermediate battery module 33 positioned, for example for battery pack 31, between the initial battery module 16a, and the final battery module 17a. Although FIG. 8 only depicts two battery packs 31, 32, any number of battery packs may be connected in series, wherein each battery pack includes at least two battery modules.

Figure 9:
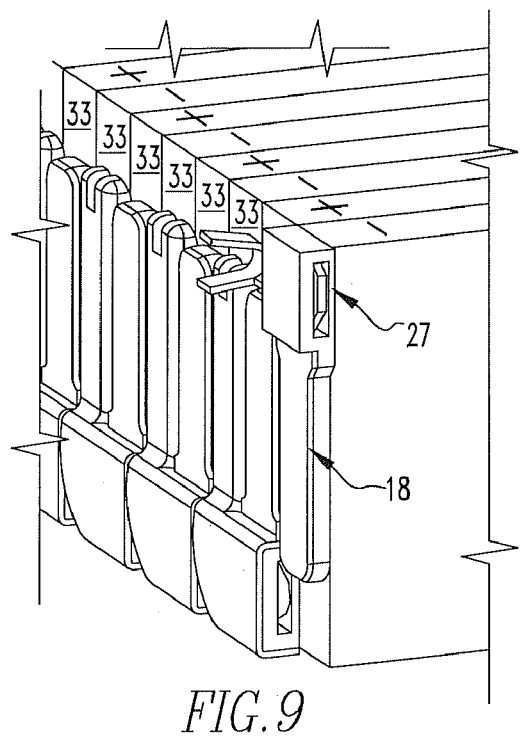
FIG. 9 (magnified view) depicts a magnified view of the initial battery module in a battery pack.

In a preferred embodiment, the first initial battery module 16a in the first battery pack 31 comprises a first initial female connector 27 to a first initial negative terminal having a slot positioned in an upper portion of the first initial battery module's 16a sidewall, as depicted in FIG. 9. Similar to the female connector 14 depicted in FIGS. 3a-3b that preferably correspond to a positive terminal, the first initial female connector 27 comprises a first initial protective cover 18 that obstructs handlers of the battery system from contacting the first initial negative terminal. Underlying the first initial protective cover 18 is the first initial negative terminal having a geometry similar to the female terminal 10 depicted in FIG. 3a. Preferably, the first initial protective cover 18 overlying the first initial negative terminal in the first battery pack 31 comprises an insertion opening for insertion of a male prong 35 in providing the negative post of the battery system.

Referring to FIG. 8, the first final battery module 17a of the first battery pack 31 and the second initial battery module 16b of the second battery pack 32 may comprise a means to electrically connect the first and second battery packs 31, 32, preferably in a series connection. The first final battery module 17a of the first battery pack 31 may comprise a first final female connector 28 to a first final positive terminal. The first final positive terminal preferably comprises a slot positioned in an upper portion of the battery module's sidewall. The first final female connector 28 further includes a first final protective cover overlying the first final positive terminal. The first final protective cover comprises an insertion opening having dimensions that provide access to the first final positive terminal while obstructing handlers of the battery system from contacting the first final positive terminal.

The second initial battery module 16b of the second battery pack 32 may comprise a second initial female connector 29 to a second initial negative terminal. The second initial female connector 29 preferably includes second initial negative terminal having a slot positioned in an upper portion of the battery module's sidewall. The second initial female connector 29 further includes a second initial protective cover overlying the first positive terminal. The second initial protective cover comprises an insertion opening having dimensions that provide access for the electrical connection to the second initial negative terminal while obstructing handlers of the battery system from contacting the second initial negative terminal. Preferably, the first final female connector 28 of the first battery pack 31 and the second initial female connector 29 of the second battery pack 32 are positioned along the same sidewall of the battery system.

In one embodiment of the present invention, the first battery pack 31 and the second battery pack 32 are in series connection through a disconnect switch that is in a series connection between the first final positive terminal 28 of the first battery pack 31 and the second initial final terminal 29 of the second battery pack 32. The interconnected first battery pack 31 and second battery pack 32 may be positioned adjacent to or distal from one another. The disconnect switch allows for the first and second battery 31, 32 packs to be engaged through a disengageable connection which allows for individual battery packs to be individually serviced.

In a preferred embodiment, the second final battery module 17b in the second battery pack 32 comprises a second final female connector 30 to a second final positive terminal having a slot positioned in an upper portion of the second final battery module's sidewall. Similar to the first initial female connector 27 depicted in FIG. 9, the second final female connector 30 comprises a second final protective cover that obstructs handlers of the battery system from contacting the second final positive terminal. Underlying the second final protective cover is the second final positive terminal having a geometry similar to the female terminal depicted in FIG. 3a. Preferably, the second final protective cover overlying the second final positive terminal in the second battery pack 32 comprises an insertion opening providing access to the positive post to the battery system, wherein the positive post may be engaged by a male prong 35.

The intermediate battery modules 33 positioned between the initial and final battery modules 16a, 16b, 17a, 17b may have the structure depicted in FIGS. 3a-4b, wherein each intermediate battery module 33 is in series connection with each adjacent intermediate battery module and/or initial battery module and/or final battery module by the engagement of the negative male terminals into the positive female terminals that are positioned in the lower portion of the battery modules sidewall, as described with reference to FIGS. 6a-6b. It is further noted that the intermediate battery modules 33 may have the configuration depicted in FIGS. 5a-5b, so long as the female connectors to the first and final battery module of each battery pack is positioned in the lower portion of the battery module's sidewall.

Figure 10:
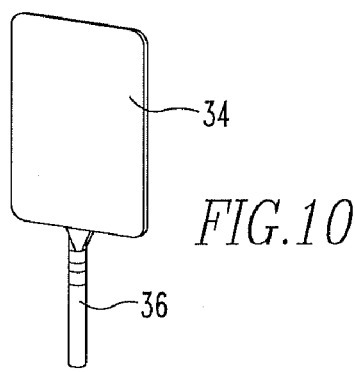
FIG. 10 (isometric view) depicts a bus bar having a high voltage measuring wire.

In another embodiment of the present invention, the intermediate battery modules 33 are in series connection with each adjacent intermediate battery module and/or initial battery module 16 and/or final battery module 17 by the at least one buss bar 34, as depicted in FIG. 10, positioned along the sidewalls of the battery modules in of the battery pack. Each buss bar 34 provides electrical communication to the positive and negative terminal of each adjacent battery module in series connection. In one embodiment, the buss bar 34 further comprises a high voltage measuring wire 36, wherein the high voltage measuring wire 36 is connected to a control module to monitor voltage across the battery modules 16, 17, 33.

Figure 11A:
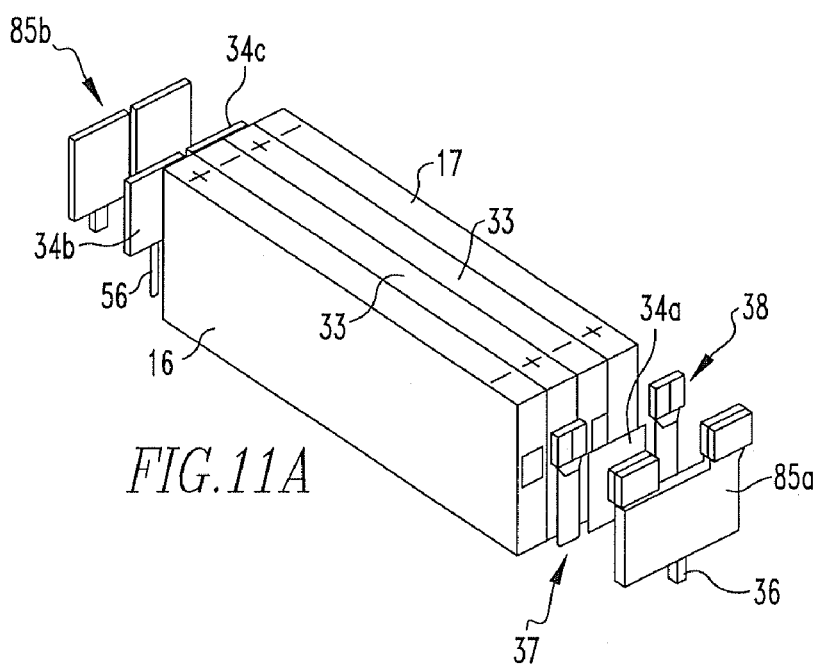
FIGS. 11a (exploded view), 11b (isometric front view), and 11c (isometric back view) depict a battery pack comprising a plurality of battery modules in series connection by the bus bar depicted in FIG. 10, wherein the battery pack comprises a female connector to a negative terminal and a female connector to a positive terminal.

Referring to FIG. 11a, a battery pack may be provided comprising an initial battery module 16 with a female connector to a negative terminal 37 in an upper portion of the module's sidewall; a final battery module 17 with a female connector to a positive terminal 38 in an upper portion of the module's sidewall, and at least one intermediate battery module 33 in series connection with the initial battery module 16 and the final battery module 17 through a buss bar 34. The female connector to the negative terminal 37 and the female connector to the positive terminal 38 in the first and final battery modules 16, 17 are preferably along the same sidewall of the battery pack. The buss bars 34 may be positioned along both sidewalls, so long as each buss bar 34 is providing electrical communication between the positive and negative terminals of adjacent battery modules in series connection. The female connectors 37, 38 and the buss bar 34 may be attached to the battery module sidewalls by welds, or glue, or bolt/nut arrangements, preferably being attached by laser welding.

At least one protective cover may be positioned covering the female terminals and the buss bars, wherein the protective cover has dimensions to obstruct handlers of the battery pack from contacting the positive and negative terminals of the battery modules. In one embodiment, a battery pack is provided comprising four battery modules in series connection having a female connector to the negative terminal 37 of the first battery module 16, a female connector to the positive terminal 38 of the final battery module 17, and a first buss bar 34a connecting two intermediate battery modules 33 along a first sidewall of the battery pack. In one embodiment, the battery pack comprises a second bus bar 34b that provides a series connection between the first battery module 16 and the adjacent intermediate battery module 33, and a third bus bar 34c that provides a series connection between the intermediate battery module 33 to the final battery module 17.

Figure 11B:
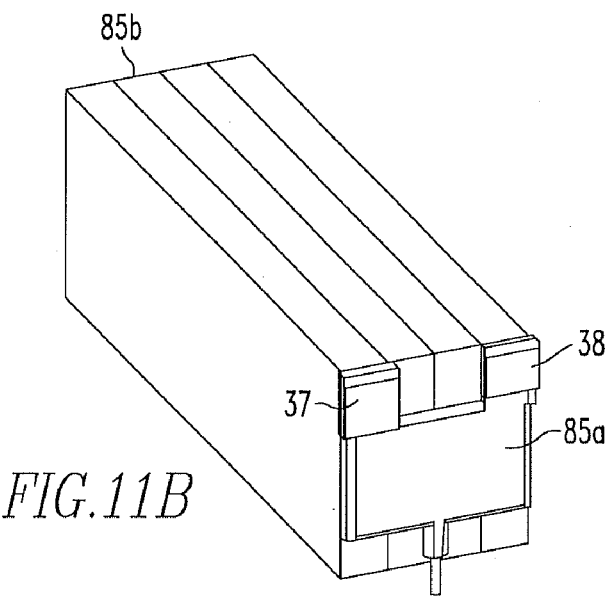
FIGS. 11d (exploded view), 11e (isometric front view), and 11f (isometric back view) depict a battery pack comprising a plurality of battery modules in series connection by the bus bar depicted in FIG. 10, wherein the battery pack comprises a male connector to a negative terminal and a female connector to a positive terminal.
Figure 11C:
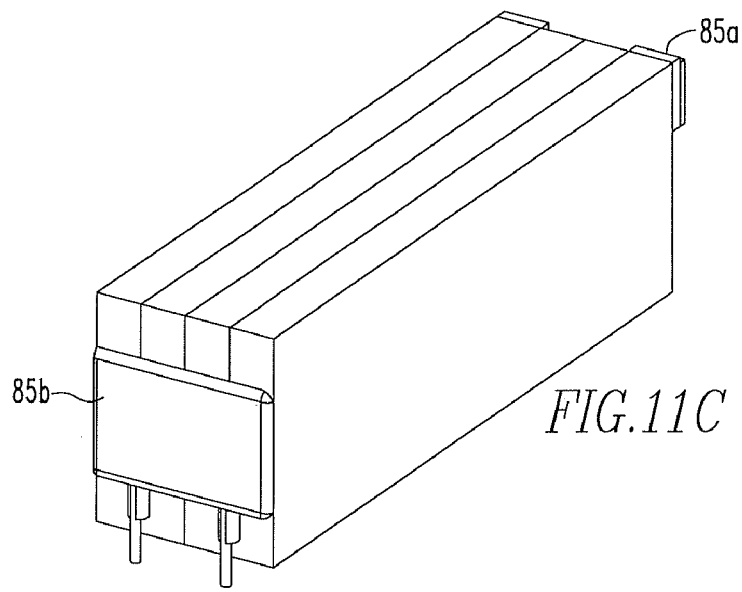

Referring to FIG. 11b, in one embodiment a single protective cover 85a is positioned along each of the battery pack's sidewalls overlying each of the female terminals and bus bars. The protective cover 85a further comprises an insertion opening that provides access to the positive and negative terminals, while maintaining dimensions and geometry that obstructs handlers from contacting the electrically conductive portions of the battery pack. Referring to FIG. 11c, in one embodiment, a single protective cover 85b is positioned along the battery pack's sidewall opposing the sidewall on which the female terminals are positioned, wherein the single protective cover 85b is overlying and fully electrically insulating each bus bars.

Figure 11D:
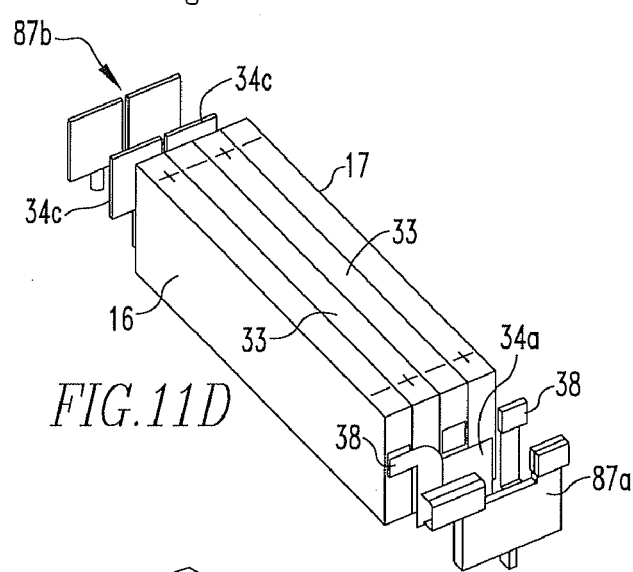
Figure 11E:
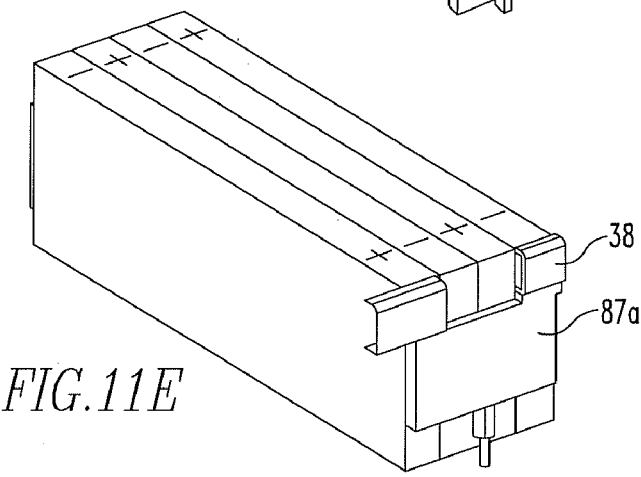
Figure 11F:
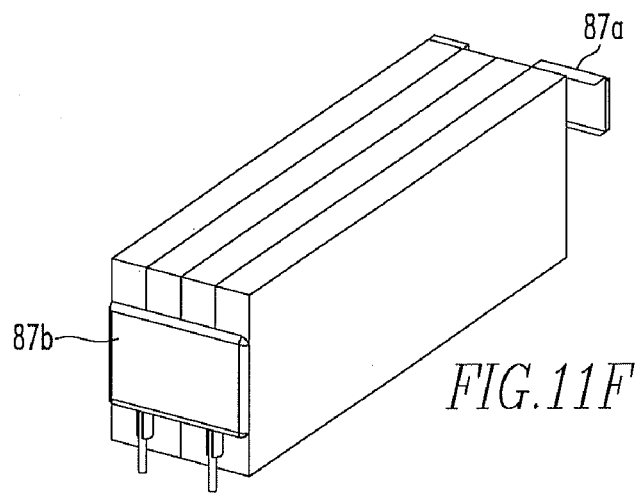

Referring to FIGS. 11d-11f, in another embodiment, the battery pack includes an initial battery module 16 with a male connector to a negative terminal 88 in an upper portion of the module's sidewall; a final battery module 17 with a female connector to a positive terminal in an upper portion of the module's sidewall, and at least one intermediate battery module 33 in series connection with the initial battery module 16 and the final battery module 17 through a buss bar 34a, 34b, 34c. The male connector to the negative terminal 88 of the initial battery module 16 may have the configuration depicted in FIG. 1. The male connector 88 provides a means for connecting adjacent battery packs in series connection.

Referring to FIG. 11d, similar to the embodiment depicted in FIGS. 11a-11c, a protective cover 87a is positioned along each sidewall of the battery pack to protect handlers from contacting the positive and negative terminals. The portion of the protective cover 87a corresponding to the male connector 88 may include an extension that extends beyond the tip of the negative terminal to reduce the incidence of contact to the negative terminal during the assembly sequence of adjacent battery packs. In one embodiment of the present invention, the portion of the protective cover 87a covering the negative terminal is configured to allow for the insertion of the male connector to the negative terminal 88 into the female connector to the positive terminal 38 of an adjacent battery pack, in which an extension of the portion of the protective cover corresponding to the male connector is slideably positioned overlying the exterior surface of the protective cover corresponding to the slot portion 11 of the female connector to the positive terminal 38 in the adjacent battery pack, as depicted in FIG. 11e. Referring to FIG. 11f, in one embodiment a single protective cover 87b is positioned along each of the battery pack's opposing sidewalls overlying and fully electrically insulating each of bus bars.

Figure 12A:
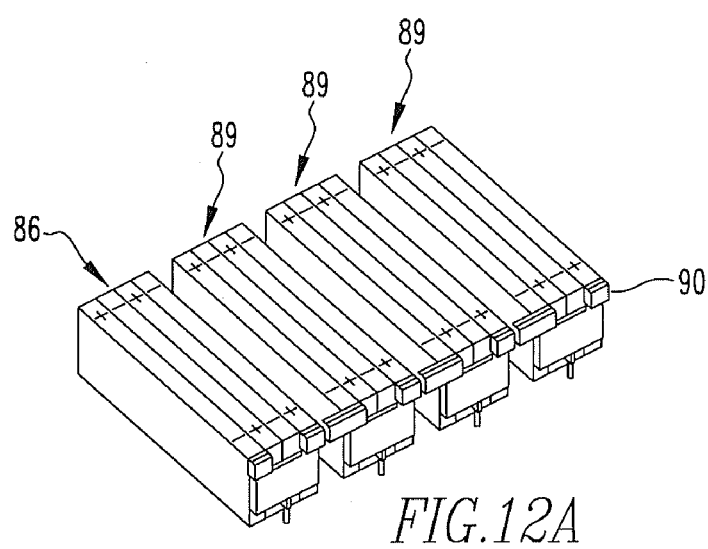
FIGS. 12a-12b (isometric view) illustrate a plurality of battery packs being electrically connected.
Figure 12B:
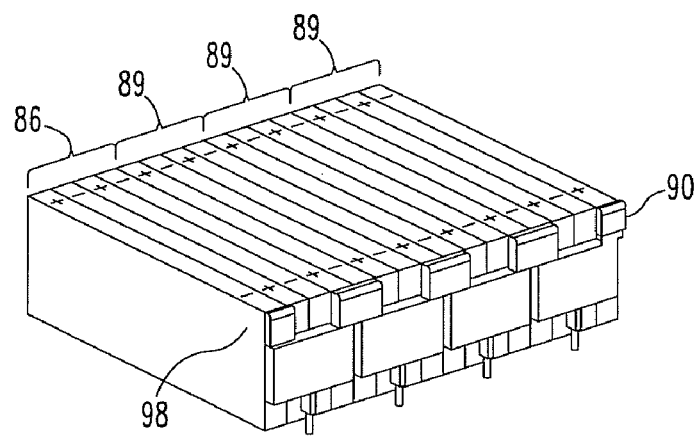

Referring to FIGS. 12a and 12b, in one embodiment, a battery pack s y s t e m comprising a plurality of interconnected battery packs may be provided beginning with an initial battery pack 86 having the structure depicted in FIGS. 11a-11c and being electrically connected to one or more battery packs 89 having the structure depicted in FIGS. 11e-11f to provide a battery pack system in which the both the positive and negative posts 90, 91 have a female connector with a protective cover that protects handlers of the battery system from electrical shock. The protective cover corresponding to the female connectors further comprises an opening allowing for a male prong to be inserted in electrical communication with the underlying terminals.

Figure 13A:
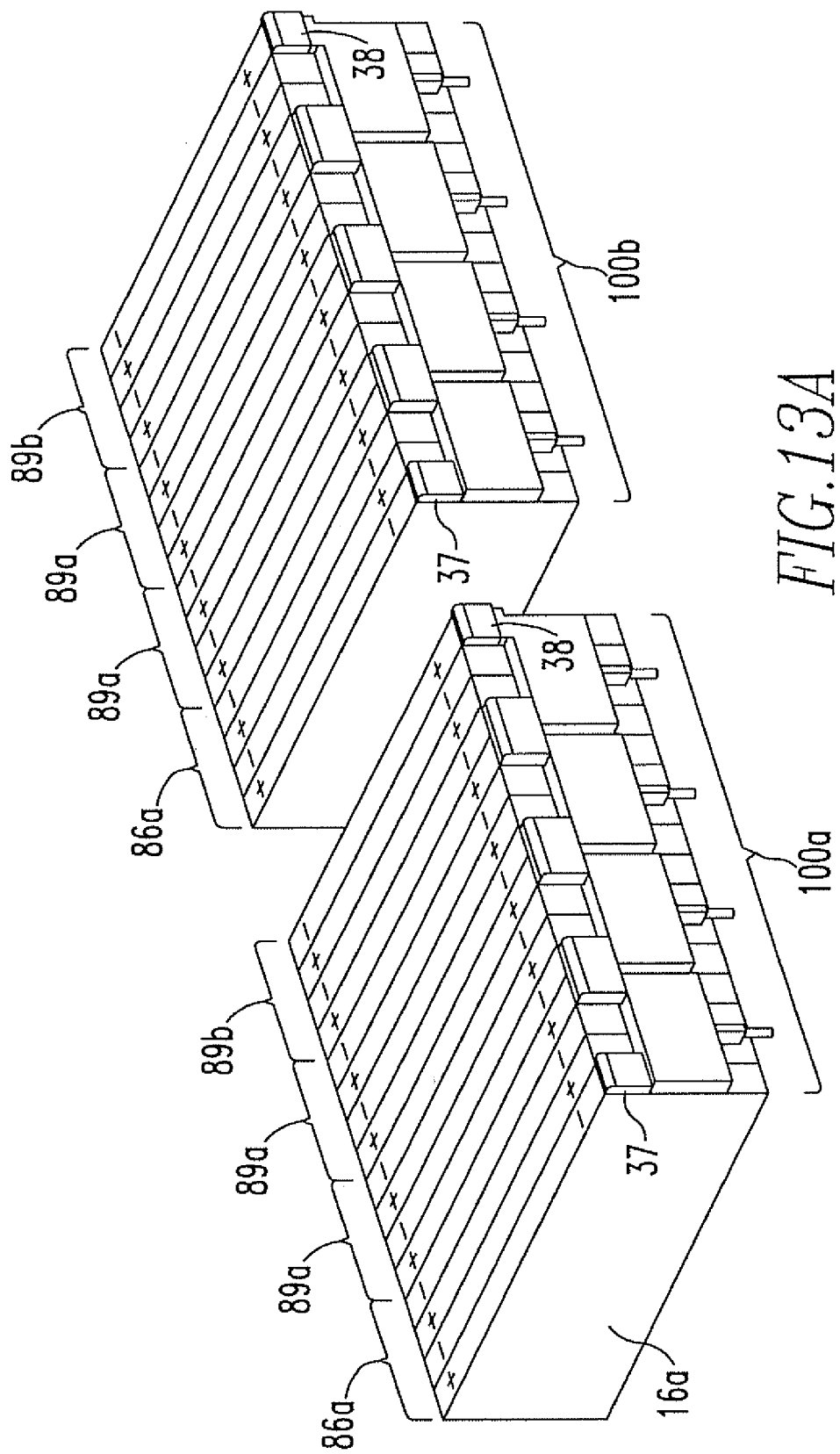
FIGS. 13a-13b (isometric view) illustrate two battery packs being positioned adjacent to or distal from one another.
Figure 13B:
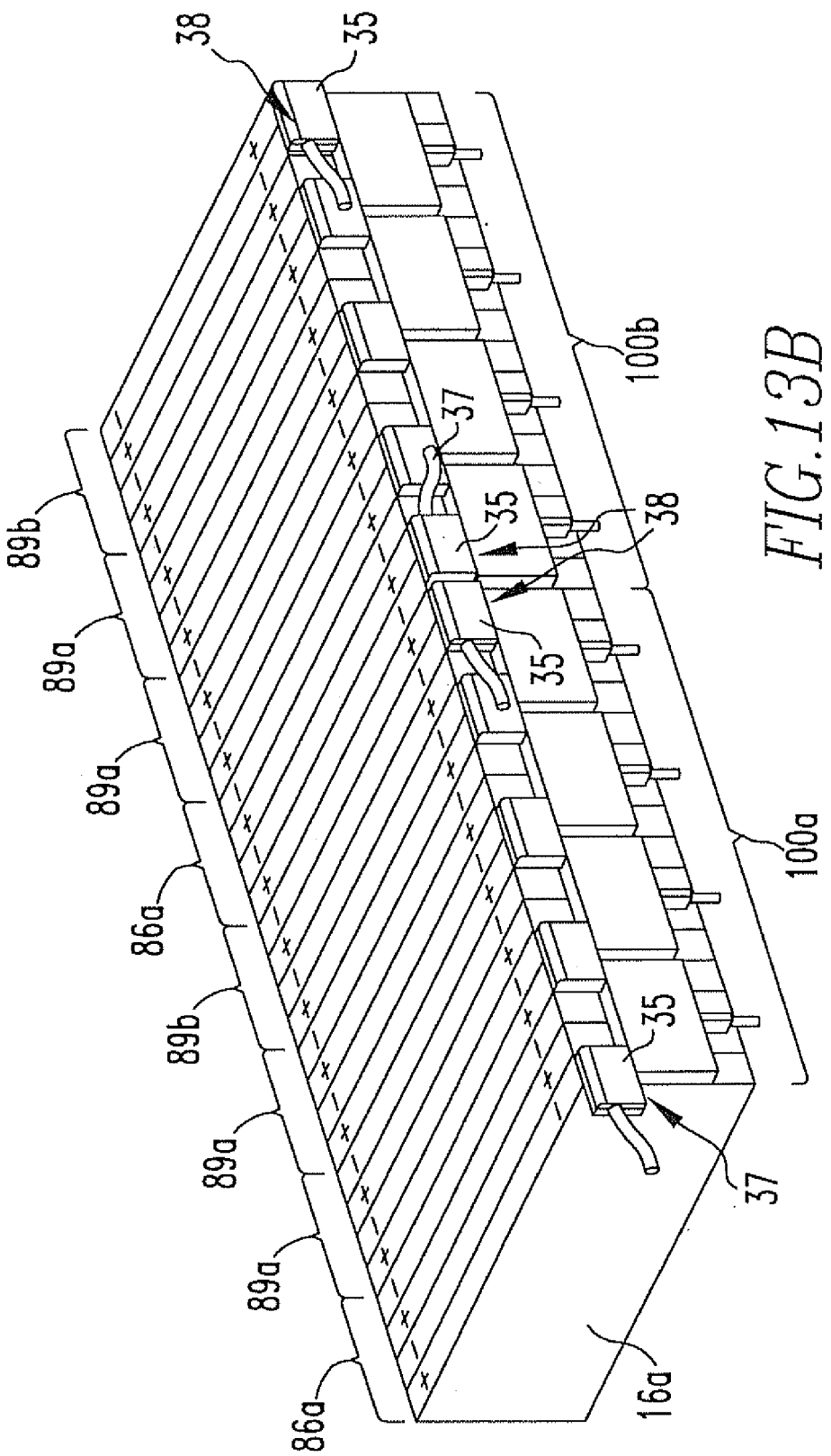

Referring to FIGS. 13a-13b, in another embodiment of the present invention, a battery system is provided comprising a plurality of interconnected battery packs including in initial battery pack 86a having the stricture depicted in FIG. 11a-11c and one or more intermediate battery packs 89a and a final battery pack 89b having the structure depicted in FIGS. 11e-11f. In this embodiment, the male connector of the intermediate battery packs and final battery pack allows for the intermediate battery packs 89a to be adjacently positioned between the first battery pack 86a and the final battery pack 89b. The initial battery pack 86a with a female connector to a negative terminal 37 in an upper portion of the initial battery module's sidewall 16a and the final battery pack with the female connector to a positive terminal 38 in an upper portion of the module's sidewall provide either the positive and negative post of the battery system or may serve as a site for series connection between battery packs having similar configurations.

Referring to FIG. 13a, similar to the previously described embodiments, a plurality of battery packs having the configuration illustrated in FIG. 12b may be connected in series connection through the final female connector to the positive terminal 38 of a first battery pack 100a and an initial female connector to a negative terminal 37 of a second battery pack 100b, preferably by wire connection. The length of the wire connection between the first 100a and second battery pack 100b may be configured so that the first and second battery packs can be positioned adjacent to or distal from one another. In one embodiment, the connection may be provided by a reversible connection through a disconnect switch having a fuse that allows for the first and second battery 100a, 100b packs to be individually serviced.

Figure 14A:
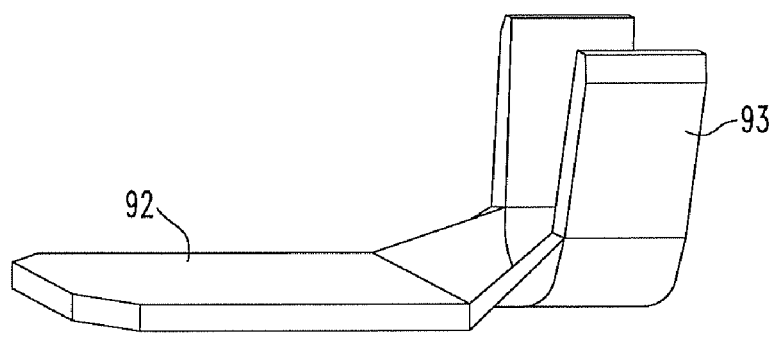
FIGS. 14a-14c (isometric view) depict a male prong and a corresponding insulating cover.
Figure 14B:
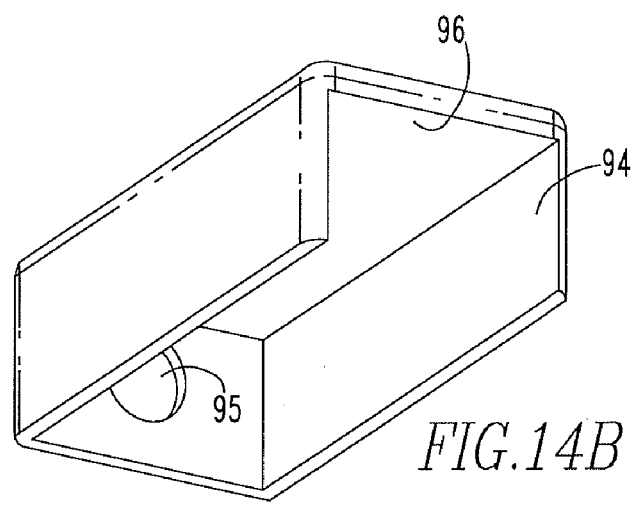
Figure 14C:
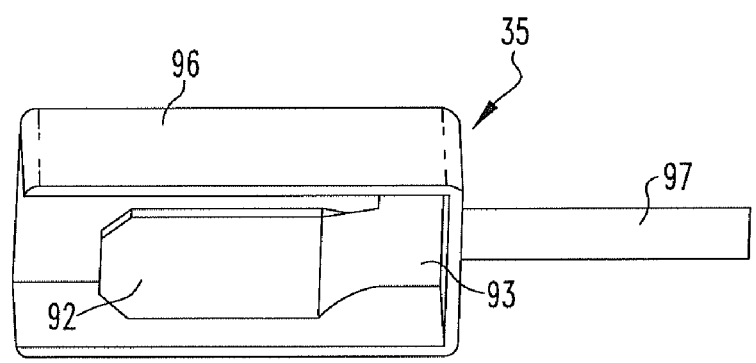

Referring to FIGS. 14a-14c, in another aspect of the present invention, a male prong 35 is provided for engagement to the female connectors 27, 28, 29, 37, 38, 90, 91 of the battery system, as depicted in FIGS. 8, 9, 11a, 11b, 11c, 11e, 12a, 12b, 13a, 13b, that provide the contacts to the positive and negative posts of the battery system or provide the sites for series engagement of multiple battery packs. Referring to FIG. 14a, the male prong may comprise an electrically conductive blade portion 92 and a grip portion 93 (crimp portion). The male prong may be formed of a stamped material selected from the group consisting of, but not limited to: copper, aluminum, steel, and combinations and alloys thereof. In a preferred embodiment, the metal prong comprises copper alloy. The blade portion 92 of the male prong is configured to be engaged through the insertion opening in at least one of the protective covers of the female connectors to a terminal of the battery system. The grip portion 93 of the male prong provides a means for mechanical attachment of the male prong 35 to an electrically conductive line or wire 97.

Referring to FIG. 14b, the male prong 35 may further include an insulating male prong cover 96 that obstructs handlers of the battery system from contacting the blade portion 92 of the male prong as it is engaged with the terminals of the battery system. In one embodiment, the insulating prong cover 96 surrounds the male prong and has an open end 94 to correspond to the female connector to the terminals in the battery system, wherein the edge of the insulating prong cover corresponding to the open end of the insulating cover 96 extends beyond the edge of the blade portion 92 of the male prong. The insulating male prong cover 96 may further include a passage 95 opposite the insulating male prong's open end 94, in which the passage 95 is positioned to allow for the wire 97 to pass through, in which the wire is crimped to the grip portion 93 of the male prong. The insulating male prong cover 96 may be any insulating material, such as plastic. FIG. 14c illustrates a preferred embodiment on an assembled male prong 35 including a blade portion 92, crimp portion 93, insulating male prong cover 96, and crimped wire 97.

In a preferred embodiment, as the male prong 35 is engaged into the female connector of the battery system, the blade portion 92 of the male prong contacts the terminal through the insertion portion of the protective cover of the female connector. Additionally, during engagement of the male prong with the terminal of the battery system, the portion of the insulating male prong cover 96 overlying the blade portion 92 of the male prong 35 is positioned atop the exterior surface of the protective cover to the female terminal, as depicted in FIG. 13b. In one embodiment of the present invention, the prongs 35 are in electrical connection to a disconnect switch 200 (break connector) through the wire 97, as depicted in FIG. 3. The disconnect switch 200 provides disengageable connectors that may be used to allow for battery packs to be connected through the disconnect switch to be individually serviced.

Figure 15:
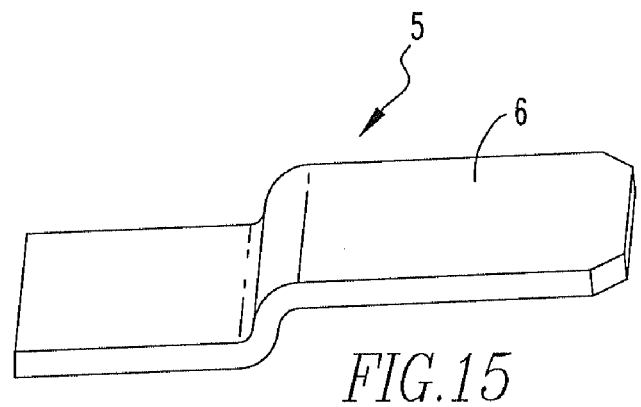
FIG. 15 (isometric view) illustrates one embodiment of a male terminal for use in battery modules having connectors positioned atop a battery cell's upper surface.
Figure 16:
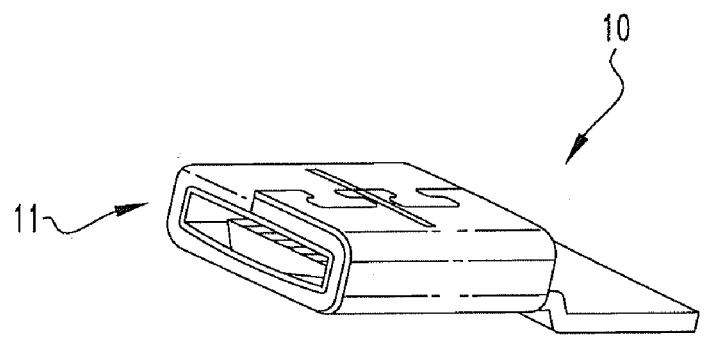
FIG. 16 (isometric view) illustrates one embodiment of a female terminal for use in battery modules having connectors positioned atop a battery cell's upper surface.
Figure 17:
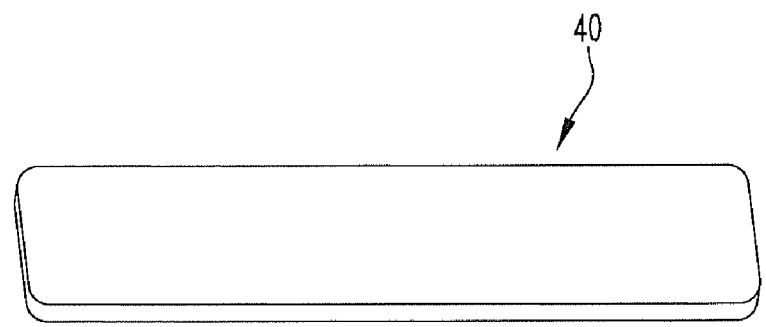
FIG. 17 (isometric view) illustrates one embodiment of a buss utilized for connecting battery cells in series connection.

In another embodiment of the present invention, a battery module comprises a plurality of cells in series connection having a male and female connector positioned atop an upper surface of the initial and concluding cell. In this embodiment of the present invention, the male terminal 5 preferably has the configuration depicted in FIG. 15. Similar to the previous embodiment, the male terminal 5 has a blade portion 6. The male terminal 5 of the present embodiment may further comprise a male base 7 configured for attachment to the upper surface of a cell. Referring now to FIG. 16, the female terminal 10 similar to the previous embodiment has a slot portion 11 configured for reversible engagement with the blade portion 6 of the male terminal 5. The female terminal 10 of the present embodiment, may further comprise a female base configured for attachment to the upper surface of a cell. Similar to the previous embodiment, the male and female terminals may be comprise any conductive material and is preferably a stamped copper alloy. Referring to FIG. 17, series connection between adjacent cells is achieved through a buss 40. The buss 40, similar to the male and female terminal 5, 10, may be formed of any conductive material and preferably comprises stamped copper alloy.

Figure 18A:
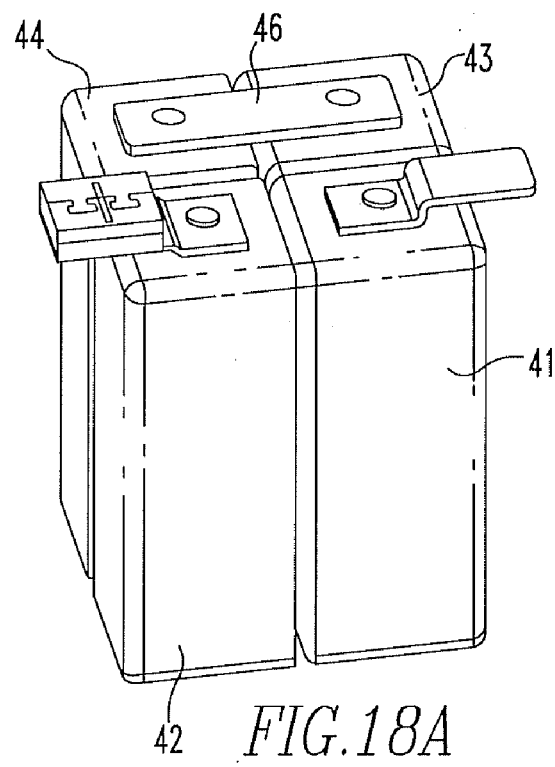
FIGS. 18a-18b (isometric view) illustrate one embodiment of a battery module of the present invention having male and female connectors positioned atop the upper surface of cells that are in series connection through the buss depicted in FIG. 17.
Figure 18B:
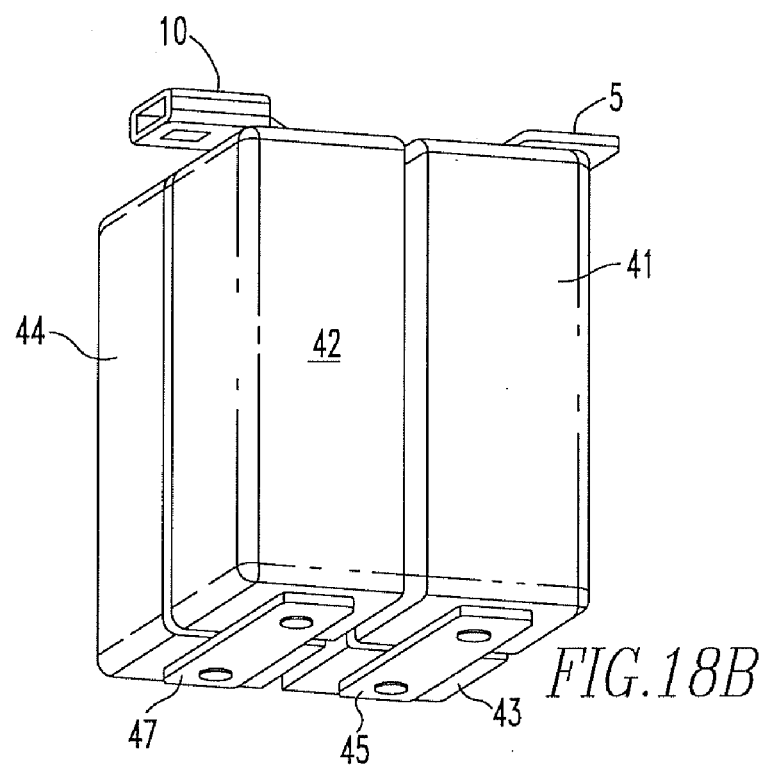

Referring to FIGS. 18a and 18b, in one embodiment of the present invention each battery module comprises a plurality of cells 41, 42, 43, 44, in series connection, preferably comprising at least 2 cells, even more preferably being 4 cells. In one example, an initial cell 41 comprises the male terminal 5 at the electrically negative side of the cell 41 and is in series connection to a second cell 43 through a first buss 45. The second cell 43 is in series connection to a third cell 44 through a second buss 46. Finally, the third cell 44 is in series connection to a final cell 42 through a third buss 47, in which the final cell 42 further comprises a female terminal 10 at the positive side of the cell. Although it is preferred that the female terminal 10 corresponds to the electrically positive side of the cell and the male terminal 5 corresponds to the electrically negative side of the cell, the male terminal 5 may alternatively correspond to the positive side of the cell and the female terminal 10 may alternatively correspond to the negative side of the cell. Each male terminal 5, female terminal 10 and buss 45, 47, 46, may be mechanically attached in electrical contact to their respective cell by welds, glue, or bolt/nut arranges, in which the mechanical attachment is preferably achieved through laser welding.

Figure 19A:
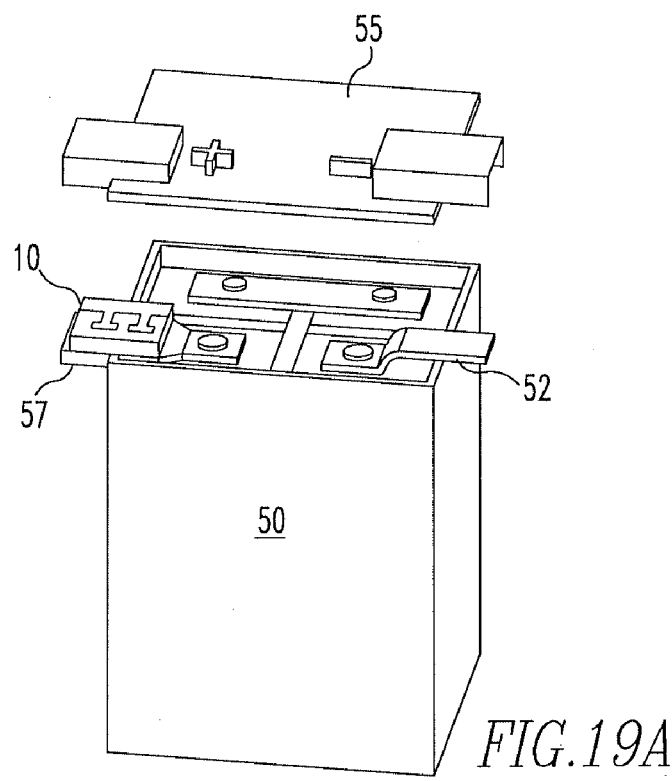
FIGS. 19a (exploded view) and 19b (isometric view) illustrate the cells in series connection depicted in FIGS. 18a-18b housed within an insulating structure and having an insulating cap corresponding to the insulating structure.
Figure 19B:
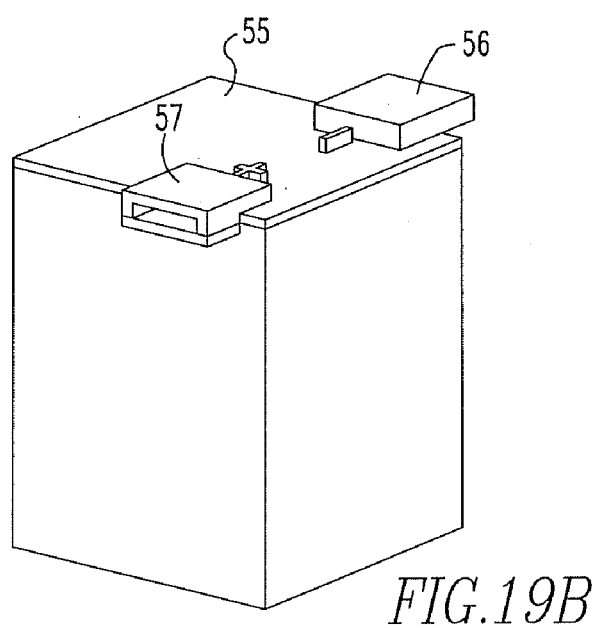

Referring to FIGS. 19a and 19b, a battery module is depicted comprising a plurality of cells 41, 42, 43, 44 housed within an insulating structure 50 having an insulating lower tab 51 corresponding to the female terminal 10, in which the insulating lower tab 51 extends beyond the perimeter of the insulating structure's 50 sidewall. In some embodiments of the present invention, the insulating structure 50 may comprise a recess in the insulating structures sidewall corresponding to the male terminal 5.

An insulating cap 55 may be fitted atop the insulating stricture 50 substantially enclosing the plurality of cells 41, 42, 43, 44. The insulating cap 55 may further comprise a male protective cap 56 corresponding to the underlying male terminal 5. The insulating cap 55 may further comprise a female protective cap 57 corresponding with the insulating lower tab 51, wherein the combination of the female protective cap 57 and the insulating lower tab 51 provide a protective enclosure for the female terminal 10 and an opening for insertion of an male terminal 5 of an adjacent battery module into electrical engagement with the female terminal 10. The dimensions of the insulating lower tab 51 and the female protective cap 57 are selected to obstruct handlers of the battery modules from contacting the female terminal 10. The insulating lower tab 51, female protective cap 57 and female terminal 10 are collectively referred to as a female connector 14. The male protective cap 56 and the male terminal 5 are collectively referred to as a male connector 15.

Figure 20A:
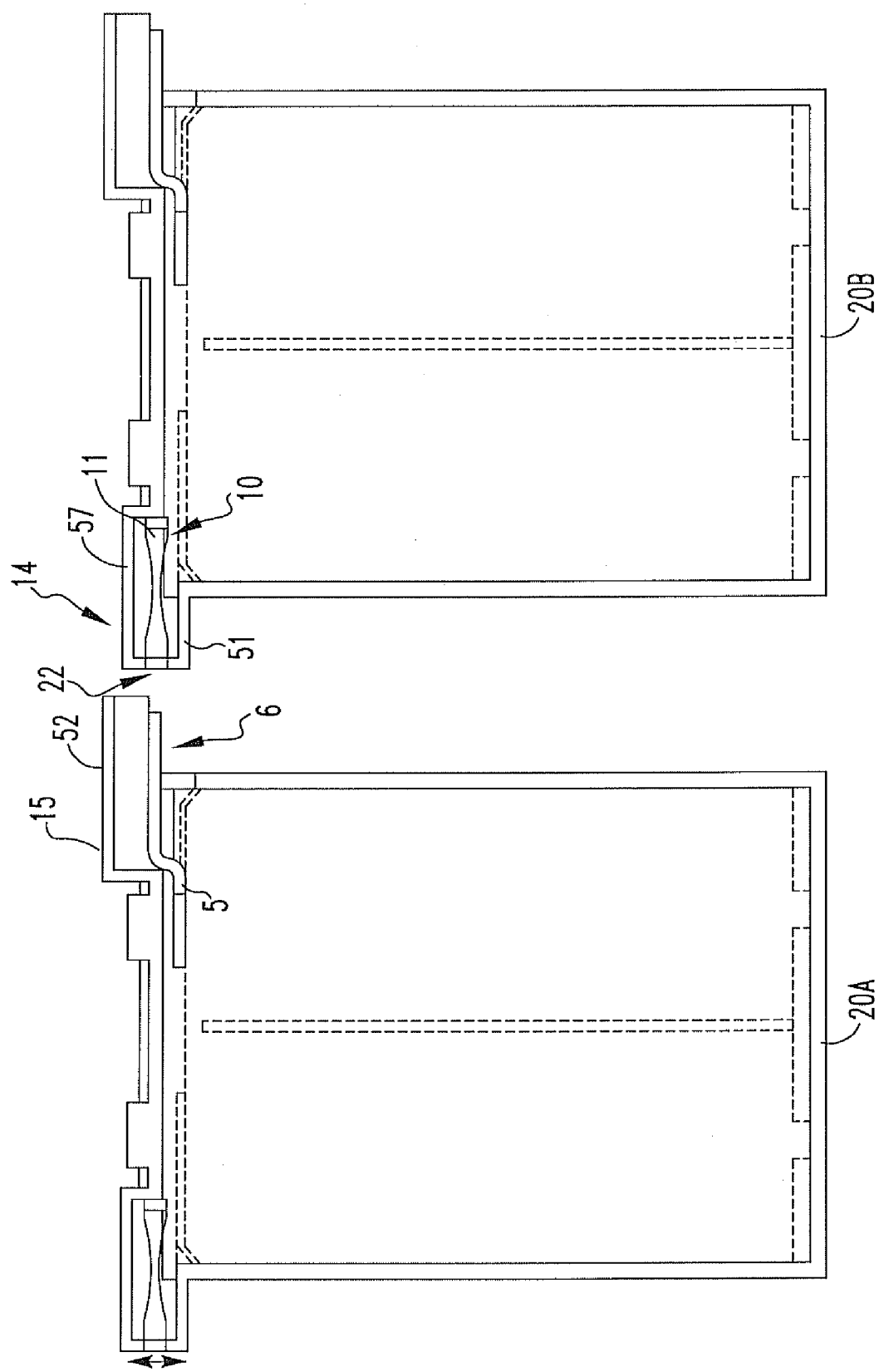

Referring to FIGS. 20a and 20b, a pair of adjacent battery modules 20a, 20b are depicted in which a first battery module 20a is electrically connected to a second battery module 20b through engaged male and female connectors 14, 15, in which the male and female terminals 5, 10 of the connectors are positioned atop the upper surface of their corresponding cells. Referring to FIG. 20b, when the adjacent battery modules 20a, 20b are in series engagement, a portion of the male protective cap 56 is positioned overlying a portion of the female protective cap 57 and the blade portion 6 of the male terminal 5 is in electrical contact with the slot portion 11 of the female terminal. The engagement of the male and female 14, 15 connectors is now described in more detail with reference to FIGS. 20a and 20b.

Referring to FIG. 20a, prior to engagement of the male and female connectors 14, 15, the blade portion 6 of the male terminal 15 is protected from incidental contact by the male protective cap 56. In one embodiment, the male protective cap 56 extends beyond the outside edge of the blade portion 6 to ensure that the blade 6 is obstructed from contact by those handling the battery module. Prior to engagement, the female terminal 10 is protected from incidental contact by an enclosure composed of the female protective cap 57 and the insulating lower tab 51 about the female terminal's exterior surface. The enclosure further comprises an opening 22 to an interior surface 23 of the slot portion 11 of the female terminal 10. The opening 22 of the enclosure has dimensions D that obstruct handlers from contacting the female terminal 10. Further, the dimensions and geometry of the opening 22 correspond to the dimensions of the blade portion 6 of the male terminal 5 to allow for the male terminal 5 to be inserted in electrical communication with the interior surface 23 of the female terminal 10.

Referring to FIG. 20b, when the adjacent battery modules 20a, 20b are in series engagement through the male and female connectors 14, 15, the extending portion of the male protective cap 56 is slideably positioned overlying the exterior surface of the female protective cap 57 corresponding to the slot portion 11 of the female terminal 10. Once engaged, electrical communication between the male and female connectors is provided by electrical contact between the inner surface of the female terminal 10 and the blade portion of the male terminal 5.

Figure 21:
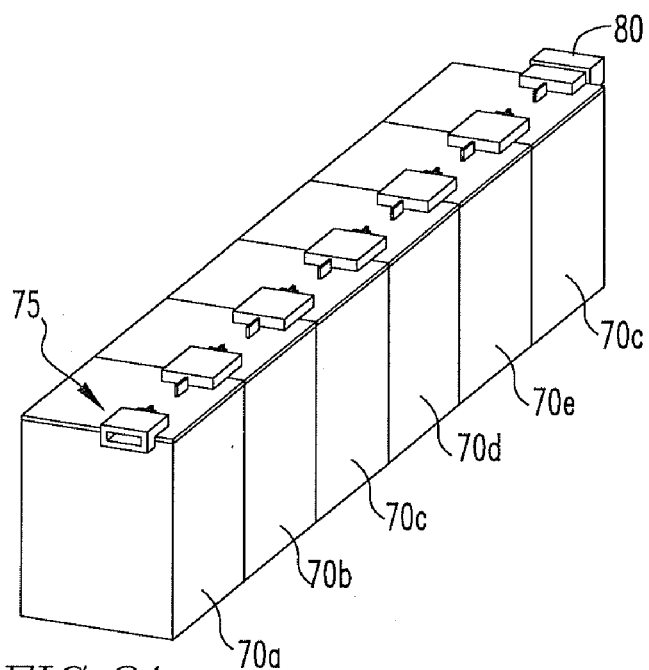
FIG. 21 (isometric view) depicts a plurality of battery modules, as depicted in FIG. 20b, in electrical connection.
Figure 22:
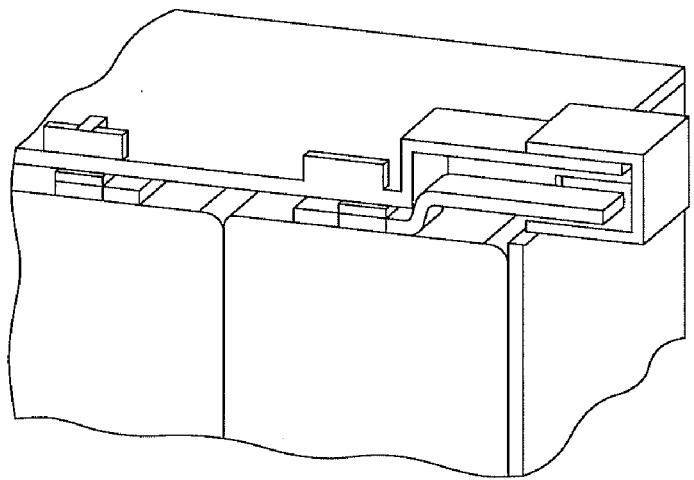
FIG. 22 (magnified view) depicts a magnified view of the handling cap positioned on a male terminal.
Figure 23:
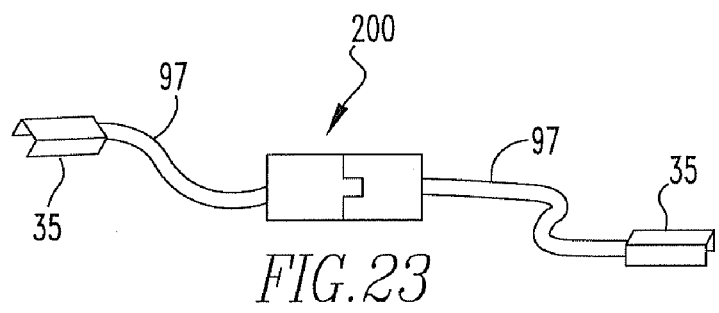
FIG. 23 (isometric view) depicts a disconnect switch (break connector).

Referring to FIG. 21, a plurality of battery modules 70a, 70b, 70c, 70d, 70e, 70f are depicted in series connection in which each battery module comprises a plurality of cells in series connection, as depicted in FIGS. 18a-18b and 19a-19b. During assembly each battery module is electrically connected in sequence, wherein the female connector of the first battery module 70f is engaged by the male connector of the adjacent module (70e, 70d, 70c, 70b, 70a in this sequence). A handling cap 80 may be placed on the first male connector of the final battery module 70f to protect the male terminal from being contacted by those handling the interconnected battery modules. A magnified view of the handling cap 80 is depicted in FIG. 22. The opening 22 in the protective enclosure of the female connector to each female terminal, including the final exposed female connector 70*a*, has dimensions D which obstruct handlers from contacting the terminal.

While the present invention has been particularly shown and described with respect to the preferred embodiments thereof, it will be understood by those skilled in the art that the foregoing and other changes in forms of details may be made without departing form the spirit and scope of the present invention. It is therefore intended that the present invention not be limited to the exact forms and details described and illustrated, but fall within the scope of the appended claims.

What is claimed is:

1. A battery module system comprising:
   a plurality of battery modules in electrical connection, each battery module of said plurality of battery modules comprising a male connector and a female connector, said female connector of said each battery module in electrical engagement into said male connector of an adjacent battery module;
   said female connector comprising a conductive female terminal having a female insulating housing configured to protect an outer surface of the conductive female terminal while providing an opening to an inner surface of said conductive female terminal; and
   said male connector comprising a conductive male terminal and an insulating male shield positioned overlying said conductive male terminal, said conductive male terminal comprising a blade portion for insertion through said opening in said female insulating housing into electrical engagement with said inner surface of said conductive female terminal of said adjacent battery module, wherein a portion of said insulating male shield overlying said blade portion of said conductive male terminal is positioned over said female insulating housing when said blade portion is in electrical engagement with said inner surface of said conductive female terminal.

2. The battery module system of claim 1 wherein said female insulating housing has dimensions to obstruct handlers of said battery module from contacting said conductive female terminal.

3. The battery module system of claim 2 wherein said female connector is positioned on a first sidewall of said each of said battery modules and said male connector is positioned on a second sidewall of said each of said battery modules, wherein said first sidewall is opposed to said second sidewall.

4. The battery module system of claim 3 wherein said conductive female terminal and conductive male terminal are mechanically attached to said first sidewall and said second sidewall.

5. The battery module system of claim 4 wherein said mechanically attached comprises welds, or glue, or bolt/nut arrangements, wherein said conductive female terminal and said conductive male terminal are in electrical contact with said battery module.

6. The battery module system of claim 4 wherein said first sidewall is electrical positive side of said battery module and said second sidewall is electrical negative side of said battery module.

7. The battery module system of claim 6 wherein said conductive female terminal comprises a slot positioned in a lower portion of said first sidewall and said blade portion of said conductive male terminal is position in a lower portion of said second sidewall.

8. The battery module system of claim 7 wherein said plurality of battery modules comprises a first preselected number of battery modules in series connection in a first battery pack beginning with a first initial battery module and terminating with a first final battery module, wherein said first initial battery module further comprises a first initial negative terminal having a first initial female connector and first initial protective cover in an upper portion of said second sidewall and said first final battery module comprises a first final positive terminal having a first final female connector and first final protective cover in an upper portion of said first sidewall.

9. The battery module system of claim 8 wherein said first initial protective cover has dimensions to obstruct handlers of said plurality of battery modules from contacting said first initial negative terminal and said first final protective cover has dimensions to obstruct handlers of said battery module from contacting said first final positive terminal.

10. The battery module system of claim 9 wherein said plurality of battery modules further comprises a second preselected number of battery modules in series connection in a second battery pack beginning with a second initial battery module and terminating with a second final battery module, wherein said second initial battery module comprises a second initial negative terminal having a second initial female connector and second initial protective cover in an upper portion of said second sidewall and said second final battery module comprises a second final positive terminal having a second final female connector and second final protective cover in an upper portion of said first sidewall.

11. The battery module system of claim 10 wherein said second initial protective cover has dimensions to obstruct handlers of said battery module from contacting said second initial negative connector and said second final protective cover has dimensions to obstruct handlers of said battery module from contacting said second final positive terminal.

12. The battery module system of claim 11 further comprising a disconnect switch electrically connecting said first battery pack and said second battery pack, said disconnect switch comprising a first battery pack connector configured to be engaged within said first final positive terminal and a second battery pack connecter configured to be inserted within said second initial negative terminal.

13. The battery module system of claim 12 wherein said first battery pack connector comprises a first male prong protected by a first insulating male prong cover, wherein said first male prong contacts an interior surface of said first final female connector and said first insulating male prong cover is positioned atop the exterior surface of the first final protective cover when said first battery pack connector is engaged within said first final positive terminal; and said second battery pack connector comprises a second male prong protected by a second insulating male prong cover, wherein said second male prong contacts an interior surface of said second initial female connector and said second insulating male prong cover is positioned atop the exterior surface of the second initial protective cover when said second battery pack connector is engaged within said second initial negative terminal.

14. The battery module system of claim 13 further comprising another battery pack comprising another plurality of battery modules in series connection, wherein said another battery back is in electrical connection with said first battery pack and said second battery pack.

15. The battery module system of claim 14 wherein said another battery pack is in series connection with said first battery pack and said second battery pack.

16. The battery module system of claim 6 wherein said female terminal comprises a slot positioned in an upper portion of said first sidewall and said blade portion of said male terminal is positioned in a upper portion of said second sidewall.

17. The battery module system of claim 15 wherein said plurality of battery modules comprises a first preselected number of battery modules in series connection beginning with an initial battery module and terminating with a final battery module, wherein said initial battery module comprises a first initial negative terminal having a first initial female connector and first initial protective cover in a lower portion of said second sidewall and said first final battery module comprises a first final positive terminal having a first final female connector and first final protective cover in a lower portion of said first sidewall.

18. The battery module system of claim 17 wherein said plurality of battery modules further comprises a second preselected number of battery modules in series connection in a second battery pack beginning with a second initial battery module and terminating with a second final battery module, wherein said second initial battery module comprises a second initial negative terminal having a second initial female connector and second initial protective cover in a lower portion of said second sidewall and said second final battery module comprises a second final positive terminal having a second final female connector and second final protective cover in a lower portion of said second sidewall.

19. The battery module system of claim 18 further comprising a disconnect switch electrically connecting said first battery pack and said second battery pack, said disconnect switch comprising a first battery pack connector configured to be engaged within said first final positive terminal and a second battery pack connecter configured to be inserted within said second initial negative terminal.

20. The battery module system of claim 19 further comprising another battery pack comprising another plurality of battery modules in series connection, wherein said another battery back is in electrical connection with said first battery pack and said second battery pack.

21. A battery module system comprising:
a plurality of battery modules in electrical connection, wherein electrical connection is provided in said plurality of battery modules is provided by engagement of a male terminal of a first battery module into a female terminal of an adjacent battery module, in which each battery module in said plurality of battery modules comprises:
a plurality of cells in electrical connection, wherein an initial cell in said plurality of cells comprises said male terminal and a concluding cell in said plurality of cells comprises said female terminal;
an insulating structure housing said plurality of cells, said insulating structure comprising a insulating lower tab corresponding to said female terminal; and
an insulating cap atop said insulating structure substantially enclosing said plurality of cells, said insulating cap comprising a male protective cap overlying said male terminal and a female insulating cap structured to correspond with said lower tab of said insulating structure to produce a protective enclosure for said female terminal and an opening for insertion of said male terminal of said adjacent battery module, wherein a portion of said male protective cap is position over said protective enclosure of said female terminal when said male terminal of said adjacent battery module is in electrical contact with said female terminal of said first battery module.

22. The battery module system of claim 21 wherein said female terminal is a positive terminal and said male terminal is a negative terminal.

23. The battery module system of claim 22 wherein said plurality of cells in electrical connection are in a series connection through at least one buss.

24. The battery module system of claim 23 wherein said plurality of cells comprise at least two cells including said initial cell and said concluding cell wherein adjacent cells are in said series connection though one of said buss.

25. The battery module system of claim 24 wherein said female terminal comprises a slot having an exterior surface enclosed by said protective enclosure and said opening for insertion of said male terminal leads to an inner surface of said female terminal.

26. The battery module system of claim 25 wherein said protective enclosure extends beyond the edge of the female terminal at said female terminals perimeter.

27. The battery module system of claim 26 wherein said protective enclosure has dimensions to obstruct handlers of said battery module from contacting said female terminal.

28. The battery module system of claim 24 wherein a handling cap is positioned on said male terminal of said first battery module in said plurality of battery modules.

29. A method using the battery module system of claim 28 wherein said handling cap is positioned on said male terminal of said first battery module in a sequence prior to engagement with said adjacent battery module, said adjacent battery module comprises said protective enclosure protecting handlers from contacting to said female terminal.

30. The method of claim 29 wherein said sequence is a plurality of battery modules assembled from first battery module to final battery module, wherein said male terminal of the first battery module and female terminal of final battery module are insulated from handler contact.

* * * * *